United States Patent
Denk et al.

(10) Patent No.: US 7,308,467 B2
(45) Date of Patent: Dec. 11, 2007

(54) METHOD FOR ON-DEMAND GENERATION OF INDIVIDUAL RANDOM NUMBERS OF A SEQUENCE OF RANDOM NUMBERS OF A 1/F NOISE

(75) Inventors: Georg Denk, Rosenheim (DE); Claus Hillermeier, Übersee (DE); Stefan Schäffler, Augsburg (DE)

(73) Assignee: Infineon Technologies AG, Munich (DE)

( * ) Notice: Subject to any disclaimer, the term of this patent is extended or adjusted under 35 U.S.C. 154(b) by 648 days.

(21) Appl. No.: 10/601,537

(22) Filed: Jun. 23, 2003

(65) Prior Publication Data

US 2004/0054702 A1    Mar. 18, 2004

Related U.S. Application Data

(63) Continuation of application No. PCT/DE01/04376, filed on Nov. 22, 2001.

(30) Foreign Application Priority Data

Dec. 22, 2000  (DE) .............................. 100 64 688

(51) Int. Cl.
  *G06F 1/02*  (2006.01)

(52) U.S. Cl. ...................................................... 708/250

(58) Field of Classification Search ......... 708/250–256
  See application file for complete search history.

(56) References Cited

U.S. PATENT DOCUMENTS

| | | | |
|---|---|---|---|
| 4,255,791 A | | 3/1981 | Martin |
| 4,353,242 A | * | 10/1982 | Harris et al. ............... 73/23.36 |
| 5,283,813 A | * | 2/1994 | Shalvi et al. ............... 708/300 |
| 5,719,784 A | | 2/1998 | Clark et al. |
| 6,088,676 A | * | 7/2000 | White, Jr. ..................... 705/1 |
| 6,161,075 A | | 12/2000 | Cohen |

OTHER PUBLICATIONS

Barton, R. J. et al.: "Signal Detection in Fractional Gaussian Noise", IEEE Transactions on Information Theory, vol. 34, No. 5, Sep. 1988, pp. 943-959.

* cited by examiner

*Primary Examiner*—Chat C. Do
(74) *Attorney, Agent, or Firm*—Laurence A. Greenberg; Werner H. Stemer; Ralph E. Locher

(57) ABSTRACT

A method for adaptively generating a series of random numbers of a 1/f noise is based on the use of normally distributed random numbers. The method enables a need-oriented generation of random numbers of the 1/f noise, whereby additional random numbers of the 1/f noise are also possible during a simulation calculation.

18 Claims, 5 Drawing Sheets

$$\underline{c} = [0.70]$$

FIG. 3A $$\underline{c}^{-1} = [1.41]$$

FIG. 3B $$\sigma = 0.84$$

FIG. 3C x-Vector No. 1: [-0.35]
x-Vector No. 2: [1.73]
x-Vector No. 3: [0.79]

FIG. 3D

μ for x-Vector No. 1: 0.00
μ for x-Vector No. 2: 0.00
μ for x-Vector No. 3: 0.00

FIG. 3E y-Vector No. 1: [-0.30]
y-Vector No. 2: [ 1.45]
y-Vector No. 3: [ 0.66]

FIG. 3F $$\underline{S} = \begin{bmatrix} 0.70 & 0.17 \\ 0.17 & 0.25 \end{bmatrix}$$

FIG. 4A $$\underline{S}^{-1} = \begin{bmatrix} 1.69 & -1.15 \\ -1.15 & 4.79 \end{bmatrix}$$

FIG. 4B $$\sigma = 0.45$$

FIG. 4C x-Vector No. 1: [-0.35, 0.39]
x-Vector No. 2: [ 1.73, 2.24]
x-Vector No. 3: [ 0.79, -0.46]

FIG. 4D

μ for x-Vector No. 1: -0.07
μ for x-Vector No. 2: 0.35
μ for x-Vector No. 3: 0.16

FIG. 4E y-Vector No. 1: [-0.30, 0.10]
y-Vector No. 2: [ 1.45, 1.37]
y-Vector No. 3: [ 0.66, -0.05]

FIG. 4F $$\underline{c} = \begin{bmatrix} 0.70 & 0.17 & 0.22 \\ 0.17 & 0.25 & 0.17 \\ 0.22 & 0.17 & 0.70 \end{bmatrix}$$

FIG. 5A $$\underline{c}^{-1} = \begin{bmatrix} 1.75 & -0.98 & -0.31 \\ -0.98 & 5.34 & -0.98 \\ -0.31 & -0.98 & 1.75 \end{bmatrix}$$

FIG. 5B $\sigma = 0.75$

FIG. 5C x-Vector No. 1: [-0.35, 0.39, -0.90]
x-Vector No. 2: [ 1.73, 2.24, -0.26]
x-Vector No. 3: [ 0.79, -0.46, 0.53]

FIG. 5D $\mu$ for x-Vector No. 1: 0.00
$\mu$ for x-Vector No. 2: 1.03
$\mu$ for x-Vector No. 3: 0.09

FIG. 5E y-Vector No. 1: [-0.30, 0.10, -0.67]
y-Vector No. 2: [ 1.45, 1.37, 0.83]
y-Vector No. 3: [ 0.66, -0.05, 0.49]

FIG. 5F

METHOD FOR ON-DEMAND GENERATION OF INDIVIDUAL RANDOM NUMBERS OF A SEQUENCE OF RANDOM NUMBERS OF A 1/F NOISE

CROSS-REFERENCE TO RELATED APPLICATIONS

This application is a continuation of copending International Application No. PCT/DE01/04376, filed Nov. 22, 2001, which designated the United States and was not published in English.

BACKGROUND OF THE INVENTION

Field of the Invention

The invention relates to a method for generating sequences of random numbers of a 1/f noise.

Random numbers of a 1/f noise can be used, for example, in a transient circuit simulation that takes account of noise influences. The 1/f noise is understood as a stochastic process with a specific frequency spectrum that can be described by the equation $$S(f) \propto \frac{1}{f^\beta}, \beta \in ]0,1[.$$

1/f noise sources are suitable for modeling noise influences in a multiplicity of technical and physical systems, and for systems for estimating and forecasting events on the financial markets. In particular, many electronic components such as, for example, pn diodes and MOS field-effect transistors exhibit 1/f noise sources.

It is possible to approximate 1/f noise sources by carrying out a summation of the effects of many noise sources which each exhibit a Lorentz-spectrum as a frequency spectrum. Such noise sources can be modeled, for example, by the system response of a linear time-invariant system, which can also be denoted as an LTI-system, at whose system input white noise is applied. It is disadvantageous in this mode of procedure for the dimension of the system of differential equations that are solved numerically to be excessively inflated. The result of this is long computing times and a high storage requirement of a computer system that is used to simulate a system that is subject to the influence of 1/f noise.

SUMMARY OF THE INVENTION

It is accordingly an object of the invention to provide a method for on-demand generation of individual random numbers of a sequence of random numbers of 1/f noise that overcomes the above-mentioned disadvantages of the prior art methods of this general type, which can be carried out quickly and with a low computational outlay. It is also an object of the invention to specify an improved method for simulating a technical system that is subject to 1/f noise. Finally, the aim is also to specify a computer system having a computer program for determining sequences of random numbers of 1/f noise that can be executed quickly and that lays claim to only a few resources of a computer system.

In accordance with the invention, the problem of noise simulation in the modeling of the system to be simulated is transformed into the problem of generating a random number sequence. In accordance with the invention, the correlations of the random numbers are determined, and this is used for a simple and accurate generation of the corresponding random number sequences.

The method according to the invention for generating at least one sequence of random numbers of 1/f noise first provides the following steps in this case:

a) determining a desired spectral value $\beta$; and
b) determining an intensity constant const.

Characteristics of the 1/f noise to be simulated are thereby fixed.

As a result, the number of random numbers of the 1/f noise that are to be generated, and a starting value for a running variable n used for the simulation are fixed.

Until the desired number of elements y(n) of one or more vectors y of length n are calculated from 1/f-distributed random numbers, the invention provides the loop-type repetition of the following steps:

a) increasing a current value of a running variable n by 1;
b) fixing a simulation time step $[t_{n-1}; t_n]$;
c) determining an element $C_{ij}$ of a covariance matrix C of dimension (n×n) according to:

$$\underline{C}_{ij} := const \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1});$$

$$i, j = 1, \ldots, n$$

d) determining a matrix $C^{-1}$ by inverting the covariance matrix C;
e) determining a variable $\sigma$ in accordance with the rule $$\sigma = sqrt(1/e(n,n)),$$

where sqrt denotes the "square root" function, and e(n,n) denoting the element of the inverted covariance matrix $C^{-1}$ indexed by (n,n);

f) determining a (0,1)–normally distributed random number which forms the nth component of a vector x of length n;
g) forming a variable $\mu$ from the first (n−1) components of the nth row of the inverted covariance matrix $C^{-1}$ and the (n−1) elements of the vector y which were calculated for a preceding (n−1) simulation time step, specifically in accordance with the following rule:

$$\mu := -\frac{y_{(n-1)}^T \cdot \underline{C}_{\bullet,n}^{-1}}{\underline{C}_{n,n}^{-1}}$$

$y_{(n-1)}$ denoting the first (n−1) components of the vector y, $C_{\bullet,n}^{-1}$ denoting the first (n−1) components of the nth row of the inverted covariance matrix $C^{-1}$, and $C^{n,n-1}$ denoting the element of the inverted covariance matrix $C^{-1}$ indexed by (n,n); and h) calculating an element y(n) of the vector y of length n from 1/f-distributed random numbers according to the following rule:

$$Y(n) = x(n) * \sigma + \mu.$$

Simulations of technical systems can be arbitrarily lengthened with the aid of the method according to the invention. It is possible for this purpose to generate additional 1/f-distributed random numbers in a simple way when already generated 1/f-distributed random numbers are to hand.

Moreover, a simulation can be based on results of previously simulated time intervals. This so-called restart capability constitutes a very important property for the practice of simulation. It is precisely for 1/f noise sources that this can be achieved only with difficulty, because random numbers that simulate a 1/f noise source for a specific time interval depend on random numbers for earlier time intervals that have already been determined numerically. The present invention also permits the use of an adaptive step size control without thereby significantly increasing the computation times for the simulation of the technical system. Such an adaptive step size control considerably increases the precision and the computation time efficiency in the numerical determination of the dynamic performance of a simulated technical system.

It is no longer necessary in the case of the method according to the invention to prescribe the time interval to be simulated. Precisely by the provision of variable step sizes, it is also possible to perform an adaptation to current system dynamics, and this increases the accuracy of the simulations.

The present invention specifies a method for generating sequences of 1/f-distributed random numbers successively, that is to say element by element. In this case, the method ensures that each newly generated random number depends in a correct way in the stochastic sense on the previously generated 1/f-distributed random numbers. It is thereby possible to generate the respectively required random numbers in the course of the numerical simulation of a circuit.

The invention uses the theory of conditional probability density in order to generate a 1/f-distributed random number that correctly ensures the stochastic relationship of the random number with the already generated random numbers required for preceding simulation steps.

In a particularly advantageous refinement of the method according to the invention, q sequences of random numbers of a 1/f noise are calculated simultaneously, instead of the steps to be repeated in the loop-type fashion:

a) determining a (0,1)–normally distributed random number which forms the nth component of a vector x of length n;

b) forming a variable u from the first (n−1) components of the nth row of the inverted covariance matrix $C^{-1}$ and the (n−1) elements of the vector y which were calculated for a preceding (n−1) simulation time step, specifically in accordance with the following rule:

$$\mu := -\frac{y_{(n-1)}^T \cdot \underline{C}_{\bullet,n}^{-1}}{\underline{C}_{n,n}^{-1}}$$

where $y_{(n-1)}$ denotes the first (n−1) components of the vector y, $C_{\bullet,n}^{-1}$ denotes the first (n−1) components of the nth row of the inverted covariance matrix $C^{-1}$, and $C_{n,n}^{-1}$ denotes the element of the inverted covariance matrix $C^{-1}$ indexed by (n,n); and c) calculating an element y(n) of a vector y of length n from 1/f-distributed random numbers according to the following rule:

$Y(n) = x(n) * \sigma + \mu,$ the following steps are provided:

d) determining a quantity q of (0,1)–normally distributed random numbers $x_{k,n}$ which form the respective last component of the vectors $x_k$ of length n, k=1, ..., q.

It is to be borne in mind in this case that the respective first (n−1) components of the vectors $x_k$ have already been calculated previously in the step.

e) forming q variables $\mu_k$ in accordance with the following rule:

$$\mu_k := -\frac{y_{(n-1),k}^T \cdot \underline{C}_{\bullet,n}^{-1}}{\underline{C}_{n,n}^{-1}}$$

$y_{(n-1),k}$ denotes the first (n−1) components of the vector $y_k$ that were calculated for a preceding simulation time step. $C_{\bullet,n}^{-1}$ denotes the first (n−1) components of the nth row of the inverted covariance matrix $C^{-1}$ and $C_{n,n}^{-1}$ denotes the element of the inverted covariance matrix $C^{-1}$ indexed by (n,n). This is carried out for k=1, ..., q.

f) calculating q elements $y_{k,n}$ which form the respective nth component of the vector $y_k$ of length n from 1/f-distributed random numbers, specifically according to the following rule:

$y_{k,n} = x_{k,n} * \sigma + \mu_k,$ k=1, ..., q.

The q vectors $y_k$ (k=1, ..., q) of length n from 1/f-distributed random numbers are arranged with particular advantage in a NOISE matrix and specify in a simulation the 1/f noise influences of a system to be simulated.

In accordance with the invention, the concept for simulating 1/f noise is based according to the invention on the following train of thought. The dynamic performance of a system that is exposed to stochastic influences is modeled adequately by a stochastic process. In order to simulate such a system dynamics, the general approach is to calculate numerically individual random realizations (so-called paths) of the fundamental stochastic processes. Simulating systems with 1/f noise sources requires paths of stochastic integrals of the form $$\int_0^t Y(s) \eta_{\frac{1}{f}}(s) \, ds$$

(s)ds to be calculated numerically. Here, s is an integration variable and t (upper integration limit) denotes the time, $$\eta_{\frac{1}{f}}(s) ds$$

(s)ds denotes a 1/f noise source, and Y(s) a stochastic process that describes the temporal dynamics of a variable, for example the electric voltage in the circuit simulation.

Using $B_{FBM}(s)$ to denote that stochastic process whose derivative (mathematically: derivative in the distribution sense) yields the 1/f noise process $$\eta_{\frac{1}{f}}(s),$$

it is possible to write the stochastic integral to be calculated as $$\int_0^t Y(s)\eta_{\frac{1}{f}}(s)\,ds = \int_0^t Y(s)\,dB_{FBM}(s) \quad (1.1)$$

The integral on the right-hand side is to be interpreted as a Riemann-Stieltjes integral of the stochastic process $Y(s)$ with the process $B_{FBM}(s)$ as an integrator. This integral can be approximated by a sum by decomposing the integration interval $[0,t]$ in accordance with $0 \equiv t_0 < t_1 < \ldots < t \equiv t$ into n disjoint subintervals $[t_i, t_{i-j}]$, i=1, n:

$$\int_0^t Y(s)\,dB_{FBM}(s) = \sum_{[illegible]}^{n} Y(t_{i-1})[B_{FBM}(t_i) - B_{FBM}(t_{i-1})] \quad (1.2)$$

This sum is a random variable. The dependence on the result ω of the random experiment has been consistently omitted.

A process $B_{FBM}(s)$ whose generalized derivative has a 1/f spectrum is known in the literature under the name of 'Fractional Brownian Motion'. $B_{FBM}(s)$ is a Gaussian stochastic process and is completely characterized as such by its expectation $$E(B_{FBM}(s)) = 0 \,\forall s \in R \quad (1.3)$$

and by its covariance function $$Cov(B_{FBM}(s), B_{FBM}(t)) = const \cdot (|s|^{\beta+1} + |t|^{\beta+1} - |t-s|^{\beta+1}) \quad (1.4)$$

The method according to the invention for on-demand generation of suitable random numbers essentially reduces the simulation of 1/f noise influences to the generation of realizations of the random variables $[B_{FBM}(t_i) - B_{FBM}(t_{i-1})]$, that is to say to the generation of increments of Fractional Brownian Motion.

The present invention permits the online generation of the required realizations of the random variables: $\Delta B_{FBM}(i)$, that is to say in the course of the successive integration of the system equations. This results in two requirements placed on the method:

(a) The length n of the sequence of random numbers $\{\Delta B_{FBM}(1), \ldots, \Delta B_{FBM}(n)\}$ must remain variable during a simulation run. In particular, it must be possible at any time to lengthen the simulation (restart capability). This implies the capability of the method to generate the additional random numbers required for this purpose such that they are correlated in a correct way with the subsequence already generated.

(b) Let ti be the currently attained time in the course of a simulation. It must then be possible to determine the time interval $[t_i, t_{i+1}]$, that is to say the step size of the next integration step, from the instantaneous system dynamics—that is to say adaptively.

The invention meets both requirements by specifying a rule as to how a realization of $\{\Delta B_{FBM}(1), \ldots, \Delta B_{FBM}(n)\}$, that is to say a sequence of random numbers, can be generated successively, that is to say element by element. The step size $\Delta t_i := t_i - t_{i-1}$ can be freely selected in this case for each new random number.

The first step is to investigate the approach for so-called "conditional densities".

The first step is to consider the distribution of the random variable vectors $(\Delta B_{FBM}(1), \ldots, \Delta B_{FBM}(n))$.

Since the individual random variables $\Delta B_{FBM}(i)$ represent increments of a Gaussian stochastic process, the random variable vector $(\Delta B_{FBM}(1), \ldots, \Delta B_{FBM}(n))$ determines an n-dimensional Gaussian-distributed random variable, and thus completely defined by its (n-dimensional) expectation E and its covariance matrix C. The two variables can be calculated from the formulas (1.3) and (1.4) as $$E(\Delta B_{FBM}(i)) = 0, i = 1, \ldots, n \quad (3.5)$$

$$\underline{\underline{C}}_{i,j} := Cov(\Delta B_{FBM}(i), \Delta B_{FSM}(j)) = \quad (3.6)$$
$$const \cdot (-|t_j - t_i|^{\beta+1} + |t_{j-1} - t_i|^{\beta+1} +$$
$$|t_j - t_{i-1}|^{\beta+1} - |t_{j-1} - t_{i-1}|^{\beta+1}), i,j = 1, \ldots, n$$

The online method according to the invention is now to be specified in the form of a complete induction.

The basis of the induction—and thus the starting point of the method—is the realization of a real Gaussian distribution with expectation 0 and variance $\Sigma_{11} = 2 \cdot const \cdot |\Delta t_1|^{\beta+1}$.

It must be specified for the purpose of inductive influence how to expand a realization of $(\Delta B_{FBM}(1), \ldots, \Delta B_{FBM}(n-1))$ by a realization of $\Delta B_{FBM}(n)$ so as to produce overall a realization of $(\Delta B_{FBM}(1), \ldots, \Delta B_{FBM}(n))$. In order to simplify the notation, the already "cubed" subsequence of random numbers may be denoted by $(y_1, \ldots y_{n-1}) =: y_{(n-1)}^T$ and the realization, still to be cubed, of $\Delta B_{FBM}(n)$ may be denoted by $y_n$.

The problem can now be formulated as now described.

Let there be given an n-dimensional zero mean Gaussian random variable Z with the covariance matrix C. Let the first n-1 elements of a realization of Z be already cubed and known in the form of a random number vector $y_{(n-1)}$.

The aim is now to find the distribution from which the nth element $y_n$ must be taken in order to complete $y_{(n-1)}$ to form a realization $y = (y_{(n-1)}, y_n)$ of Z.

A solution to this task can be found when the conditional probability density $f(y_n | y_{(n-1)})$ are considered for $y_n$—with the condition that $y_{(n-1)}$ already holds. This variable can be calculated in the present case of a Gaussian normal distribution as $$f(y_n | y_{(n-1)}) = \frac{1}{\sqrt{2\pi \frac{1}{\underline{\underline{C}}_{n,n}^{-1}}}} \exp\left\{-\frac{1}{2\frac{1}{\underline{\underline{C}}_{n,n}^{-1}}}(y_n - \mu)^2\right\}. \quad (3.7)$$

The variable $C_{n,n}^{-1}$ is yielded in this case from the following notation of the inverted covariance matrix $C^{-1}$ as:

$$\underline{\underline{C}}^{-1} = \left( \begin{array}{c|c} \underline{\underline{C}}_{(n-1)}^{-1} & \underline{\underline{C}}_{\bullet,n}^{-1} \\ \hline \underline{\underline{C}}_{\bullet,n}^{-1} & \underline{\underline{C}}_{n,n}^{-1} \end{array} \right), \quad (3.8)$$

where $\underline{\underline{C}}_{(n-1)}^{-1} \in R^{(n-1) \times (n-1)}$,

-continued where $\underline{C}^{-1}_{\bullet,n} \in R^{(n-1)}$ and where $\underline{C}^{-1}_{n,n} \in R$.

The variable μ stands for $$\mu := -\frac{y_{(n-1)}^T \underline{C}^{-1}_{\bullet,n}}{\underline{C}^{-1}_{n,n}}, \quad (3.9)$$

The conditional density $f(y_n | y_{(n-1)})$ is therefore the probability density of a Gaussian normal distribution with a mean of μ and variance of $$\frac{1}{\underline{C}^{-1}_{n,n}}.$$

It must hold that $C_{n,n}^{-1} \neq 0$ in order for the above variance to exist. This is ensured on the basis of the following argumentation. Let C and $C^{-1}$ have the same characteristic directions and inverse eigenvalues. An eigenvalue 0 of the matrix $C^{-1}$ would therefore have an infinite variance of the random variable vector $(\Delta B_{FBM}(1), \ldots, \Delta B_{FBM}(n))$ as a consequence. It may therefore be presupposed that all the eigenvalues of $C^{-1}$ are nonvanishing. Since the eigenvalues of $C^{-1}$ are non-negative, in any case, it therefore holds that: The matrix $C^{-1}$ is symmetrical and positively defined. It is possible by renaming the coordinate axes to bring this matrix from the form (3.8) to the following form:

$$\underline{C}^{-1} := \begin{pmatrix} \underline{C}^{-1}_{n,n} & (\underline{C}^{-1}_{\bullet,n})^T \\ \underline{C}^{-1}_{\bullet,n} & \underline{C}^{-1}_{(n-1)} \end{pmatrix} \quad (3.10)$$

This matrix is likewise symmetrical and positively defined per constructionem. In accordance with the Sylvester criterion for symmetrical and positively defined matrices, it follows therefrom that $(\overline{C}^{-1})_{11} = C_{n,n}^{-1} > 0$, and the assertion is demonstrated.

The method according to the invention reduces a simulation of $$\frac{1}{f}$$

noise sources to the generation of Gaussian-distributed random numbers.

The inverted covariance matrix $C^{-1}$ (an n×n matrix) is required in order to generate a random number $y_n$ that is correlated in the way required with an already generated sequence $y_{(n-1)}$. Strictly speaking, all that is required is knowledge of the nth row of this matrix, that is to say knowledge of $$((\underline{C}^{-1}_{\bullet,n})^T, \underline{C}^{-1}_{n,n}).$$

As is to be read from formula (3.6), the covariance matrix C depends on the decomposition of the simulation interval $[0,t_n]$ into disjoint subintervals (step sizes) $[t_{i-1}, t_i]$. In particular, the last column of C depends on $t_n$ (doing so identically with the last row because of the symmetry of C), and thus on the current step size $\Delta t_n = t_n - t_{n-1}$.

The left-hand upper (n−1)×(n−1) submatrix $\overline{C}$ of the n×n covariance matrix C is precisely the covariance matrix for a random number sequence of length n−1. This covariance matrix had already to be determined and inverted for calculating y(n−1) or for calculating the last element $(y_{n-1})$. In order to accelerate the method, it is therefore possible to have recourse to an incremental method for matrix inversion, for example by use of the Schur complement.

The invention is also implemented in a method for simulating a technical system that is subject to 1/f noise. In this case, random numbers that have been determined with the aid of a method according to the invention are used in modeling and/or fixing the variables present on the input channels of the system.

Also provided is a computer system and/or a computer program for determining sequences of random numbers of a 1/f noise, or for executing the other methods according to the invention. The invention is also implemented in a data medium having such a computer program. Furthermore, the invention is implemented in a method in which a computer program according to the invention is downloaded from an electronic data network, such as from the Internet, for example, on a computer connected to the data network.

Other features which are considered as characteristic for the invention are set forth in the appended claims.

Although the invention is illustrated and described herein as embodied in a method for on-demand generation of individual random numbers of a sequence of random numbers of 1/f noise, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3A-3F show calculation examples for a first simulation time step;

FIGS. 4A-4F show calculation examples for a second simulation time step; and

FIGS. 5A-5F show calculation examples for a third simulation time step.

DESCRIPTION OF THE PREFERRED EMBODIMENTS

Figure 1:
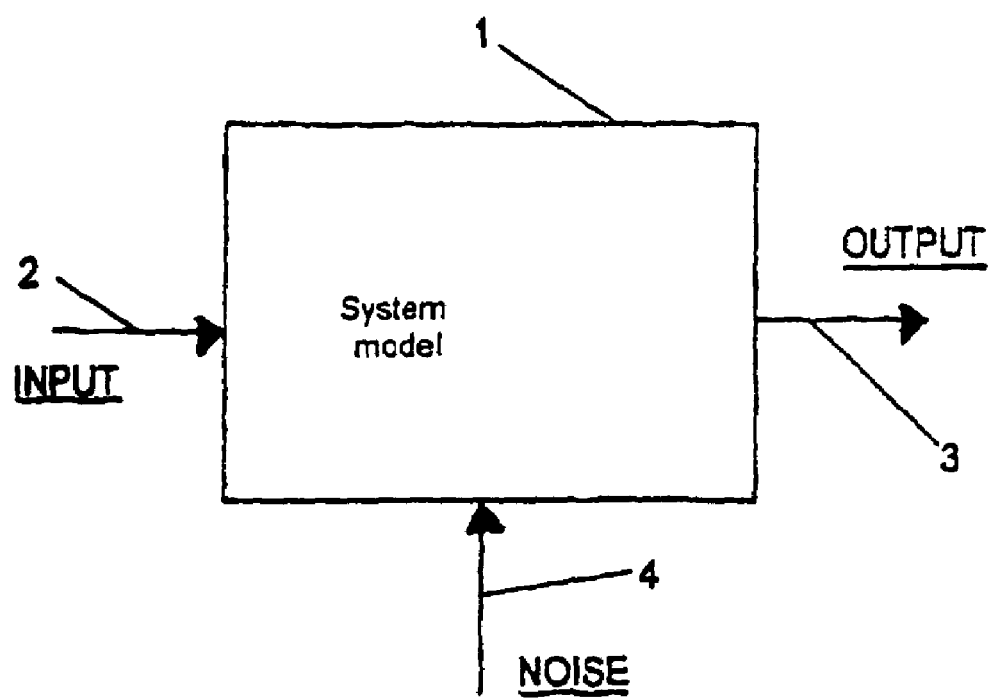
FIG. 1 is a block diagram of a technical system to be simulated.

Referring now to the figures of the drawing in detail and first, particularly, to FIG. 1 thereof, there is shown a schematic diagram of a noisy system that is to be simulated.

The system is described by a system model 1 that is indexed as a box and describes the system behavior. The system behavior results from input channels 2, which are also designated as vector INPUT and from output channels 3, which are also designated as OUTPUT. Furthermore, a system-dictated noise is provided, which is present on noise input channels 4 and which is also designated as a vector or as a matrix NOISE. The matrix NOISE is present when the noise is taken into account with a plurality of channels, each column of the matrix NOISE containing a vector of noise values which are present on a noise input channel.

The noise on the noise input channels 4 is preferably interpreted as a noise-dictated alteration of the system model 1.

The behavior of the input channels 2 and of the output channels 3 can be described by a system of differential equations or by a system of differential-algebraic equations, so that reliable predictions of the system behavior are possible.

For each time step of the simulation of the system shown in FIG. 1, a vector OUTPUT of the output channels 3 is calculated for a vector INPUT present on the input channels 2 and for a vector NOISE present on the noise input channels 4.

For the simulation over a relatively long period of time, the vectors INPUT, OUTPUT, NOISE are expediently specified as a matrix, a respective column k of the relevant matrix containing the values of the corresponding time series of the relevant INPUT, OUTPUT, NOISE.

Figure 2:
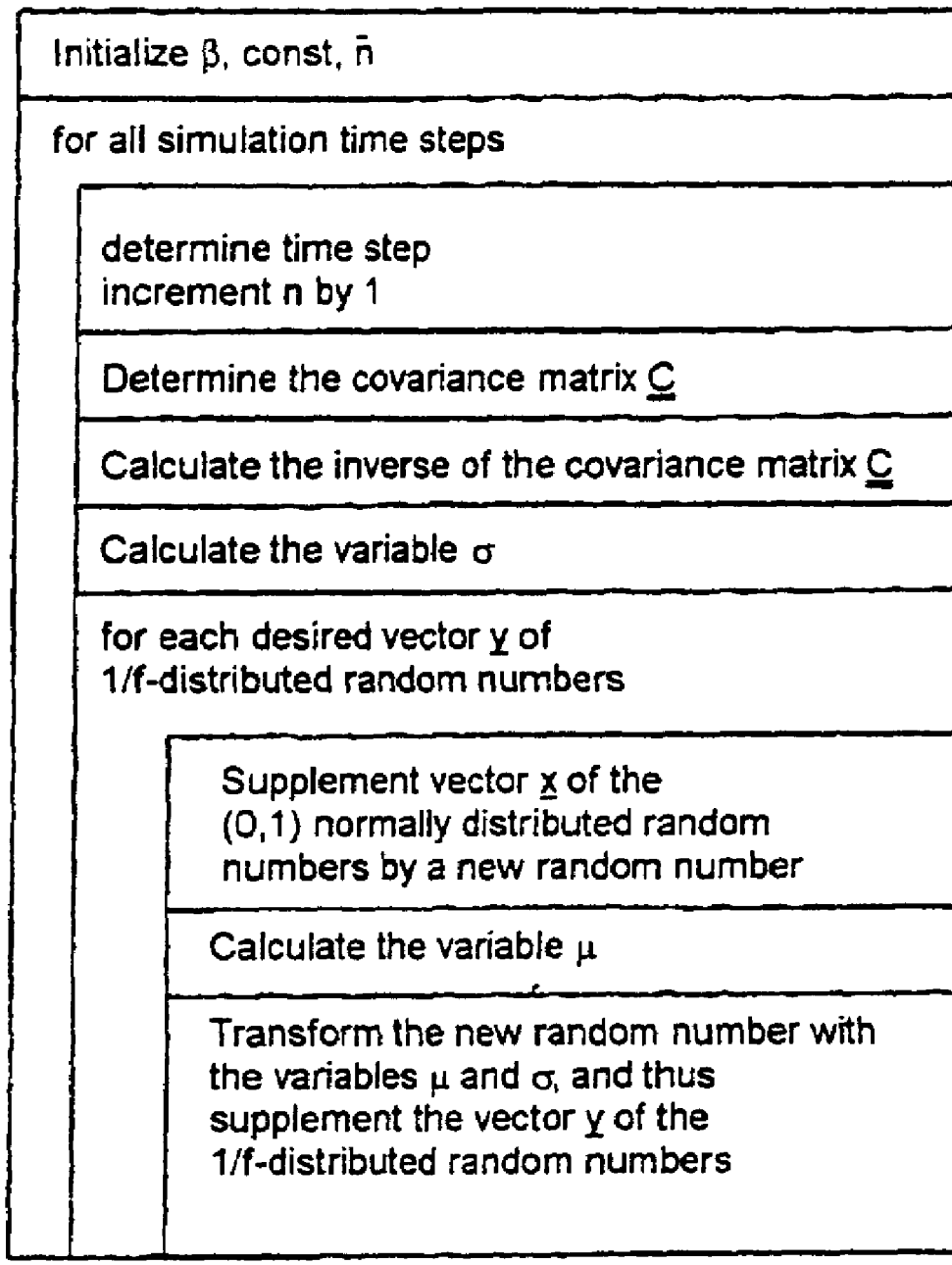
FIG. 2 is a structogram for determining sequences of random numbers of 1/f noise.

FIG. 2 illustrates how a respective vector $y_k$ is attained which forms a column k of the matrix NOISE for the noise input channels 4 of the system model 1. Each vector $y_k$ serves for simulating a noise source.

In a first step, a desired spectral value $\beta$, and an intensity constant const are fixed. Furthermore, a counter n of the current simulation time interval is set to 0. The following sequence of computation steps is then carried out successively for each simulation time step.

First, the current simulation time step is fixed. Equivalently to this, it is also possible to fix the end of the current simulation time step, thereby producing the next point in time under consideration.

Afterward, the counter n of the current simulation time step is incremented by one.

The covariance matrix C of dimension (n×n) is subsequently determined according to equation (3.6).

This is followed by the step of inverting the matrix C, for example by use of a Cholesky decomposition. In order to raise the efficiency, it is also possible in this case to appeal to the inverse matrix of the previous step, for example by using Schur complement techniques.

Next, the variable $\sigma$ is calculated from the formula $$\sigma = sqrt(1/e(n,n))$$

where sqrt denotes the "square root" function and where e(n,n) denotes that element of the inverted covariance matrix $C^{-1}$ which is indexed by (n,n).

In addition, a value of a (0,1)–normally distributed random variable $X_k$ is extracted and the vector $x_k$ of the normally distributed random numbers is thereby supplemented. The extracted random number has the expectation of 0 and the variance of 1. This step is carried out for each noise source to be simulated.

Furthermore, a variable $\mu_k$ is formed. It is formed from the first (n−1) components of the nth row of the inverted covariance matrix $C^{-1}$ and from the sequence of (n−1) 1/f-distributed random numbers which were calculated for the preceding (n−1) simulation time steps.

For this purpose, the procedure is in accordance with formula (3.9). This step is carried out for each noise source k to be simulated.

Finally, that element of the matrix NOISE is calculated whose column index k specifies the noise source to be simulated and whose row index is equal to n. The current simulation time step is denoted by this. The currently calculated element r(k,n) of the matrix NOISE represents a random number which, together with the superjacent (n−1) elements of the same column k of NOISE, forms a vector $y_k$ of length n from 1/f-distributed random numbers. The vector $y_k$ serves for simulating one of the noise sources for the first n simulation time steps.

Each element $y_k$ of the nth row of NOISE is then determined, on the basis of equations (3.7)–(3.9), from the last random number $x_k$ of the vector x and the variables $\mu_x$ and $\sigma$, to be precise according to the following rule:

$$y_k = x_k * \sigma + \mu_x.$$

FIGS. 3A to 5F depict exemplary embodiments reproducing concrete results of calculation.

The value of the spectral value $\beta$ is always adopted in this case as 0.5. The value of the intensity const is arbitrarily adopted as 1.0. Three random numbers are simultaneously processed in each case in accordance with the simulation of three noise sources simultaneously acting, on separate channels, on the system to be simulated and which are disposed in a vector $y_k$, k being an integral value from 1 to 3.

FIGS. 3A-3F show a calculation example for a first simulation time step $[t_0,t_1]=[0,0.5]$.

FIG. 3A shows the covariance matrix C of dimension 1×1 for generating a 1/f-distributed random number in the case of the simulation step size. C represents here only a scalar with the value 0.70, because C(1,1)—that is to say with i=j=1—results upon applying equation (3.6) as $$1.0 \cdot (-|t_1-t_1|^{0.5+1}+|t_{1-1}-t_1|^{0.5+1}+|t_1-t_{1-1}|^{0.5+1}-|t_{1-1}-t_{1-1}|^{0.5+1}) = 0+0.5^{1.5}+0.5^{1.5}-0 = 0.707106\ldots;$$

FIG. 3B shows the inverse of the covariance matrix C from FIG. 3A, something which was performed here by use of a Cholesky decomposition not illustrated in more detail here. A check of $(C\ C^{-1}) = (0.707106\ldots\ 0.707106\ldots^{-1})$ yields the correct value 1, and this illustrates the correctness of the value for C(1,1).

FIG. 3C shows a variable $\sigma$ for the first simulation step n=1. This is yielded from the equation $$\sigma = sqrt(1/0.707106\ldots),$$

sqrt denoting the square root and e (1,1) denoting the element $0.707106\ldots$, indexed by (1,1), of the inverted covariance matrix $C^{-1}$.

FIG. 3D shows three values $x_1$, $x_2$, $x_3$ of a (0,1)–normally distributed random variable $X_k$ for one noise source to be simulated in each case. These values form the first element of one vector $x_k$ each of the normally distributed random numbers. The extracted random numbers have the expectation of 0 and the variance of 1.

FIG. 3E shows three variables $\mu_k$ for each of the three noise sources to be simulated. The variable $\mu_k$ is yielded in accordance with formula (3.9) from the first (n−1) components of the nth row of the inverted covariance matrix $C^{-1}$ as well as from the sequence of (n−1) 1/f-distributed random numbers that were calculated for the preceding (n−1) simulation time steps. In the first simulation step, these two vectors each have the length 0. It therefore follows for all the variables $\mu_k$ in the first simulation step that: $\mu_k=0$.

FIG. 3F shows three vectors $y_k$ of length 1 of 1/f-distributed random numbers that simulate the behavior of three 1/f-distributed noise sources of the first simulation time step $[0, t_1]=[0, 0.5]$. The matrix NOISE is yielded from the three vectors $y_k$. The value k is an integral value of from 1 to 3 in this case. Each element $y_k$ of the first row of NOISE is determined on the basis of equations (3.7)–(3.9) according to the following rule from the last random number $x_k$ of the associated vector x and the variables $\mu_k$ and $\sigma_1$. For example, the first element $y_1(n=1)$ of the first vector $y_1$ is calculated as follows:

$y_1(n=1)=x_1(n=1)^* \sigma+\mu_1=-0.35\ldots *0.84\ldots$
$+0.00\ldots=-0.30\ldots$ $y_2(n=1)$ and $y_3(n=1)$ are calculated by analogy herewith.

With the aid of FIGS. 4A to 4F, there is shown a calculation example of a second simulation time step $[t_1, t_2]=[0.5, 0.75]$. The value n for the second simulation time step is always equal to 2.

FIG. 4A shows the covariance matrix C of dimension $(n \times n)=2 \times 2$, which is required for generating one further random number each per noise source. Together with the result in accordance with FIG. 3F, the random number thus newly generated forms a vector $y_k$ of length 2 from 1/f-distributed random numbers. A vector $y_k$ is generated in this case for each noise source. The covariance matrix C is determined in this case according to equation (3.6).

For example, this is carried out at the element C(2,1)—that is to say with i=2 and j=1. From applying equation (3.6), C(2,1) is yielded as $$1.0 \cdot (-|t_1 - t_2|^{0.5+1} + |t_{1-1} - t_2|^{0.5+1} +$$
$$|t_1 - t_{2-1}|^{0.5+1} - |t_{1-1} - t_{2-1}|^{0.5+1}) =$$
$$(-|0.5 - 0.75|^{0.5+1} + |0 - 0.75|^{0.5+1} +$$
$$|0.5 - 0.5|^{0.5+1} - |0 - 0.5|^{0.5+1}) =$$
$$-0.125 + 0.6495\ldots + 0 - 0.3535\ldots = 0.1709\ldots$$

FIG. 4B shows the inverse of the covariance matrix C from FIG. 4A. A check (not illustrated here) of the condition $(C\ C^{-1})$ yields a matrix of dimension 2×2, in the case of which the elements indexed by (1,1) and (2,2) are equal to 1. The other elements have the value 0.

FIG. 4C shows a variable $\sigma$ that is calculated from the inverted covariance matrix $C^{-1}$ of step 4B. The variable $\sigma$ is yielded as $\sigma=sqrt(1/e(n,n))=sqrt(1/e(2,2))=sqrt(1/4.79\ldots)=0.45\ldots;$ sqrt denoting the square root, and e(2,2) denoting the element, indexed by (2,2) of the inverted covariance matrix $C^{-1}$ from FIG. 4B.

FIG. 4D shows three vectors $x_k$ of independent (0,1)-normally distributed random numbers, the vectors $x_k$ each having a length of 2. A (0,1)-normally distributed random variable $x_k$ is extracted per noise source to be simulated. The extracted random number in each case has the expectation of 0 and the variance of 1. The vectors $x_k$ of the normally distributed random numbers from FIG. 3D are thereby supplemented such that the vectors $x_k$ of the normally distributed random numbers from FIG. 4D result.

FIG. 4E shows three variables $\mu_k$ that were calculated from the inverted covariance matrix $C^{-1}$ in accordance with step 4B and from the three random numbers in accordance with step 3F. For each noise source to be simulated, the variable $\mu_k$ is calculated from the (n–1) first components of the nth row of the inverted covariance matrix $C^{-1}$ and from the sequence of a quantity (n–1) of 1/f-distributed random numbers that were calculated in accordance with formula (3.9) for the preceding (n–1) simulation time steps. In the second simulation step, the variable $\mu_k$ is thus calculated from the first component of the second row of $C^{-1}$ as well as from the first component of the vector $y_k$. This is carried out, for example, with the aid of the value $\mu_1$:

$$\mu_1 = \frac{y_{(n-1),1}^T \cdot C^{-1}_{=\bullet,n}}{C^{-1}_{=n,n}} =$$
$$= \frac{-0.30\ldots \cdot -1.15\ldots}{4.79\ldots} =$$
$$= -0.07\ldots$$

FIG. 4F shows three vectors $y_k$ of length 2 with 1/f-distributed random numbers that simulate the behavior of three 1/f-distributed noise sources for the second simulation time step $[t_1, t_2]=[0.5, 0.75]$. The matrix NOISE is yielded from the three vectors $y_k$. The value k is an integral value of from 1 to 3 in this case. Each element $y_k$ of the second row of NOISE is determined on the basis of equations (3.7)–(3.9) according to the following rule from the last random number $x_k$ of the associated vector x and the variables $\mu_k$ and $\sigma$. By way of example, the second element $y_1(n=2)$ of the first vector $y_1$ is calculated below:

$y_1(n=2)=x_1(n=2)^* \sigma+\mu_1=0.39\ldots * 0.45\ldots -0.07$
$\ldots=0.10\ldots$ With the aid of FIGS. 5A-5F, there is shown a calculation example for a third simulation time step $[t_2, t_3]=[0.75, 1.25]$. The value n is always equal to 3 during the third simulation time step.

FIG. 5A shows the covariance matrix C of dimension $(n \times n)=3 \times 3$, which is required for generating one further random number each per noise source. Together with the result in accordance with FIG. 4F, the random number thus newly generated forms a vector $y_k$ of length 3 from 1/f-distributed random numbers. A vector $y_k$ is generated in this case for each noise source. The covariance matrix C is determined in this case according to equation (3.6).

For example, this is carried out at the element C(3,1)—that is to say with i=3 and j=1. From applying equation (3.6), C(3,1) is yielded as $$1.0 \cdot (-|t_1 - t_3|^{0.5+1} + |t_{1-1} - t_3|^{0.5+1} + |t_1 - t_{3-1}|^{0.5+1} - |t_{1-1} - t_{3-1}|^{0.5+1}) =$$
$$= (-|0.5 - 1.25|^{0.5+1} + |0 - 1.25|^{0.5+1} + |0.5 - 0.75|^{0.5+1} - |0 - 0.75|^{0.5+1})$$

-continued $$= -0.6495\ldots + 1.3975\ldots + 0.125 - 0.6495\ldots = 0.22\ldots\,.$$

FIG. 5B shows the inverse $C^{-1}$ of the covariance matrix C from FIG. 5A. A check (not illustrated here) of the condition ($C\ C^{-1}$) yields a matrix of dimension 3×3, in the case of which the elements indexed by (1,1), (2,2) and (3,3) are equal to 1. The other elements have the value 0.

FIG. 5C shows a variable σ that is calculated from the inverted covariance matrix $C^{-1}$ of step 5B. The variable σ is yielded as $$\sigma = sqrt(1/e(n,n)) = sqrt(1/e(3,3)) = sqrt(1/1.75\ldots) = 0.75\ldots;$$

sqrt denoting the square root, and e(3,3) denoting the element, indexed by (3,3) of the inverted covariance matrix $C^{-1}$ from FIG. 5B.

FIG. 5D shows three vectors $x_k$ of independent (0,1) normally distributed random numbers, the vectors $x_k$ each having a length of 3. A (0,1) normally distributed random variable $x_k$ is extracted per noise source to be simulated. The extracted random number in each case has the expectation of 0 and the variance of 1. The vectors $x_k$ of the normally distributed random numbers from FIG. 4D are thereby supplemented such that the vectors $x_k$ of the normally distributed random numbers from FIG. 5D result.

FIG. 5E shows three variables $\mu_k$ that were calculated from the inverted covariance matrix $C^{-1}$ in accordance with step 5b and from the three random numbers in accordance with step 4f. For each noise source to be simulated, the variable $\mu_k$ is calculated from the (n−1) first components of the nth row of the inverted covariance matrix $C^{-1}$ and from the sequence of (n−1) 1/f-distributed random numbers that were calculated in accordance with formula (3.9) for the preceding (n−1) simulation time steps. In the second simulation step, the variable $\mu_k$ is thus calculated from the first two components of the third row of $C^{-1}$ as well as from the first two components of the vector $y_k$. This is carried out, for example, with the aid of the value $\mu_1$:

$$\mu_1 = \frac{y^T_{(n-1),1} \cdot C^{-1}_{\bullet,n}}{C^{-1}_{n,n}} =$$

$$= \frac{-0.30\ldots \cdot -0.31\ldots + 0.10\ldots \cdot -0.98}{1.75\ldots} =$$

$$= -0.00\ldots\,.$$

FIG. 5F shows three vectors $y_k$ of length 3 with 1/f-distributed random numbers that simulate the behavior of three 1/f-distributed noise sources for the third simulation time step $[t_2, t_3] = [0.75, 1.25]$. The matrix NOISE is yielded from the three vectors $y_k$. The value k is an integral value of from 1 to 3 in this case. Each element $y_k$ of the third row of NOISE is determined on the basis of equations (3.7)–(3.9) according to the following rule from the last random number $x_k(n=3)$ of the associated vector x and the variables $\mu_k$ and σ. By way of example, the third element $y_1(n=3)$ of the first vector $y_1$ is calculated below:

$$y_1(n=3) = x_1(n=3)\,{}^*\sigma + \mu_1 = -0.90\ldots\,{}^*\,0.75\ldots + 0.00\ldots = -0.67\ldots$$

The following conditions remain to be observed for the purpose of concrete execution of the calculation examples shown.

The numerical values shown in FIGS. 3, 4 and 5 reproduce intermediate and final results of the computing steps, described with reference to FIG. 2, for a first, for a second and for a third simulation interval. In this case, after accurate numerical calculation, all values are truncated after the second decimal place following the point in order to be able to reproduce them more effectively. Consequently, when computationally reaccomplishing the exemplary embodiments, it is necessary to calculate further not with the intermediate values shown in the figures, but with the exact intermediate values, in order to reach the specified y vectors starting from the specified x vectors.

Vectors of (0,1) normally distributed random variables are shown in FIGS. 3C, 4C and 5C. In this case, a random variable represents a noise source in each case. For the sake of simplicity, it is not illustrated here how such random numbers are reached with the aid of the expectation of 0 and the variance of 1. This is familiar to the person skilled in the art.

We claim:

1. A computer implemented method for numeric simulation of an electric circuit influenced by noise, comprising the steps of:

numerically simulating the electric circuit using a model including input channels, noise input channels and output channels, the behavior of the input channels and of the output channels being described by a system of differential equations or a by a system of differential algebraic equations;

in the numerical simulation step, calculating an output vector for an input vector present on the input channels and a noise vector y of 1/f distributed random numbers present on the noise input channel, wherein generation of the noise vector y includes the steps of:

determining a desired spectral value β;

determining a number of the random numbers of the 1/f noise to be generated;

determining an intensity constant const;

setting a starting value for a running variable n;

performing a loop-type repetition until a desired number of elements y(n) of a vector y of length n is calculated from 1/f-distributed random numbers, by the steps of:

increasing a current value of the running variable n by 1;

setting a simulation time step $[t_{n-1};\ t_n]$;

determining elements $C_{ij}$ of a covariance matrix C of dimension (n×n) according to:

$$C_{ij} := const \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1})\ i,j=1,\ldots,n$$

determining an inverted covariance matrix $C^{-1}$ by inverting the covariance matrix C;

determining a variable σ in accordance with $$\sigma = sqrt(1/e(n,n)),$$

where sqrt denotes a square root function, and e(n,n) denotes an element of the inverted covariance matrix $C^{-1}$ indexed by (n,n);

determining a (0,1)-normally distributed random number which forms an nth component of a vector x of length n;

forming a variable µ from first (n−1) components of an nth row of the inverted covariance matrix $C^{-1}$ and (n−1) elements of the vector y calculated for a preceding (n−1) simulation time step, according to:

$$\mu := -\frac{y_{(n-1)}^T \cdot C^{-1}_{=\bullet,n}}{C^{-1}_{=n,n}}$$

where $y_{(n-1)}$ denotes first (n−1) elements of the vector y, $C_{\cdot,n}^{-1}$ denotes the first (n−1) components of the nth row of the inverted covariance matrix $C^{-1}$, and $C_{n,n}^{-1}$ denotes a component of the inverted covariance matrix $C^{-1}$ indexed by (n,n); and calculating an element y(n) of the vector y of length n from the 1/f-distributed random numbers, according to:

y(n)=x(n)*σ+µ;

outputting the at least one sequence of random numbers of 1/f noise.

2. A method for simulating a technical system subject to 1/f noise, which comprises the steps of:
determining random numbers according to claim 1; and
using the random numbers for modeling variables present on input channels of the technical system.

3. A computer system, comprising:
processor programmed for executing the method for determining the sequences of random numbers of the 1/f noise according to claim 2.

4. A computer running a computer program, comprising:
computer-executable instructions for carrying out the method according to claim 1 for determining the sequences of random numbers of the 1/f noise.

5. A computer running the instructions stored on a computer-readable data medium having the computer-executable instructions according to claim 4.

6. A downloading method, which comprises the step of:
downloading the computer program according to claim 4 from an electronic data network onto a computer connected to the electronic data network.

7. The method according to claim 6, which further comprises using the Internet as the electronic data network.

8. A computer system, comprising:
processor programmed for executing the method for determining the sequences of random numbers of the 1/f noise according to claim 1.

9. A method for simulating a technical system subject to 1/f noise, which comprises the steps of:
determining random numbers according to claim 1; and
using the random numbers for fixing variables present on input channels of the technical system; and
simulating the technical system and outputting the result of the simulation.

10. A computer implemented method for numeric simulation of an electric circuit influenced by noise, comprising the steps of:
numerically simulating the electric circuit using a model including input channels, noise input channels and output channels, the behavior of the input channels and of the output channels being described by a system of differential equations or a by a system of differential algebraic equations;

in the numerical simulation step, calculating an output vector for an input vector present on the input channels and a noise vector y of 1/f distributed random numbers present on the noise input channel, wherein generation of the noise vector y includes the steps of:

determining a desired spectral value β;
determining a number of the random numbers of the 1/f noise to be generated;
determining an intensity constant const;
setting a starting value for a running variable n;
calculating q secpiences of the random numbers of the 1/f noise simultaneously, by performing looptype repetitions until a desired number of elements $y_{k,n}$ of a vector y of length n is calculated from 1/f-distributed random numbers, by the steps of:

increasing a current value of the running variable n by 1;

setting a simulation time step $[t_{n-1}; t_n]$;

determining elements $C_{ij}$ of a covariance matrix C of dimension (n×n) according to:

$C_{ij} := \text{const} \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1})$. i,j=1,...,n determining an inverted covariance matrix $C^{-1}$ by inverting the covariance matrix C;

determining a variable σ in accordance with

σ=sqrt (1/e(n,n)), where sqrt denotes a square root function, and e(n,n) denotes an element of the inverted covariance matrix $C^{-1}$ indexed by (n,n);

determining a quantity q of (0,1)-normally distributed random numbers $x_{k,n}$ which form a respective last component of vectors $x_k$ of length n, where k=1, ..., q, forming q variables $\mu_k$ according to:

$$\mu_k := -\frac{y_{(n-1),k}^T \cdot C^{-1}_{=\bullet,n}}{C^{-1}_{=n,n}}$$

where $y_{(n-1),k}$ denotes first (n−1) elements of the vector $y_k$ that were calculated for a preceding simulation time step, $C_{\cdot,n}^{-1}$ denotes the first (n−1)

components of the nth row of the inverted covariance matrix $C^{-1}$, and $C_{n,n}^{-1}$ denotes the element of the inverted covariance matrix $C^{-1}$ indexed by (n,n), where k=1, ..., q; and calculating q elements $y_{k,n}$ which form a respective nth component of the vector $y_k$ of length n from 1/f-distributed random numbers, according to:

$y_{k,n} = x_{k,n} * \sigma + \mu_k$ where k=1, ..., q;

outputting at least one of the q sequences of random numbers of 1/f noise.

11. A method for simulating a technical system subject to 1/f noise, which comprises the steps of:
determining random numbers according to claim 10; and
using the random numbers for modeling variables present on input channels of the technical system.

12. A computer system, comprising:
processor programmed for executing the method for determining the sequences of random numbers of the 1/f noise according to claim 11.

13. A computer running a computer program, comprising:
   computer-executable instructions for carrying out the method according to claim 10 for determining the sequences of random numbers of the 1/f noise.

14. A computer running the instructions stored on a computer-readable data medium having the computer-executable instructions according to claim 13.

15. A downloading method, which comprises the step of:
   downloading the computer program according to claim 13 from an electronic data network onto a computer connected to the electronic data network.

16. The method according to claim 15, which further comprises using the Internet as the electronic data network.

17. A computer system, comprising:
   processor programmed for executing the method for determining the sequences of random numbers of the 1/f noise according to claim 10.

18. A method for simulating a technical system subject to 1/f noise, which comprises the steps of:
   determining random numbers according to claim 10; and
   using the random numbers for fixing variables present on input channels of the technical system; and
   simulating the technical system and outputting the result of the simulation.

* * * * *

UNITED STATES PATENT AND TRADEMARK OFFICE
CERTIFICATE OF CORRECTION

PATENT NO. : 7,308,467 B2
APPLICATION NO. : 10/601537
DATED : December 11, 2007
INVENTOR(S) : Denk et al.

It is certified that error appears in the above-identified patent and that said Letters Patent is hereby corrected as shown below:

Column 2,

Line 21, "$C_{ij}$" should read -- $\underline{C}_{ij}$ --

Line 21, "C" should read -- $\underline{C}$ --

Line 29, "$C^{-1}$" should read -- $\underline{C}^{-1}$ --

Line 30, "C;" should read -- $\underline{C}$; --

Line 54, " $C^{-1}_{\bullet,n}$ " should read -- $\underline{\underline{C}}^{-1}_{\bullet,n}$ --

Line 55, "$C^{-1}$," should read -- $\underline{C}^{-1}$ --

Line 56, " $C^{-1}_{n,n}$ " should read -- $\underline{\underline{C}}^{-1}_{n,n}$ --

Line 57, "$C^{-1}$" should read -- $\underline{C}^{-1}$ --

Column 3,

Line 54, " $C^{-1}_{\bullet,n}$ " should read -- $\underline{\underline{C}}^{-1}_{\bullet,n}$ --

Line 55, "$C^{-1}$," should read -- $\underline{C}^{-1}$ --

Line 55, " $C^{-1}_{n,n}$ " should read -- $\underline{\underline{C}}^{-1}_{n,n}$ --

Column 4,

Line 15, " $C^{-1}_{\bullet,n}$ " should read -- $\underline{\underline{C}}^{-1}_{\bullet,n}$ --

Line 16, " $C^{-1}_{n,n}$ " should read -- $\underline{\underline{C}}^{-1}_{n,n}$ --

Signed and Sealed this

Thirtieth Day of November, 2010

David J. Kappos
*Director of the United States Patent and Trademark Office*

CERTIFICATE OF CORRECTION (continued)
U.S. Pat. No. 7,308,467 B2

Line 17, "$C^{-1}$" should read -- $\underline{C}^{-1}$ --

Column 6,

Lines 8 and 36, "C" should read -- $\underline{C}$ --

Line 55, "$C^{-1}$" should read -- $\underline{\underline{C}}^{-1}_{n,n}$ --

Column 7,

Line 22, " $C^{-1}_{n,n} \neq 0$ " should read -- $\underline{\underline{C}}^{-1}_{n,n} \neq 0$ --

Line 24, "C" should read -- $\underline{C}$ --

Lines 24, 25, 29, 30, 31, "$C^{-1}$" should read -- $\underline{C}^{-1}$ --

Lines 44, " $\left(\overline{C}^{-1}\right)_{11} = C^{-1}_{n,n} > 0$ " should read -- $\left(\underline{\underline{C}}^{-1}\right)_{11} = \underline{\underline{C}}^{-1}_{n,n} > 0$ --

Line 57, "$C^{-1}$" should read -- $\underline{C}^{-1}$ --

Column 8,

Lines 1, 4 and 8, "C" should read -- $\underline{C}$ --

Line 5, "C)," should read -- $\underline{C}$), --

Column 9,

Lines 43 and 45, "C" should read -- $\underline{C}$ --

Column 10,

Lines 31, 33 and 39, "C" should read -- $\underline{C}$ --

Line 34, "C(1,1)—" should read -- $\underline{C}(1,1)$ - --

Line 43, "(C $C^{-1}$)" should read -- $(\underline{C}\,\underline{C}^{-1})$ --

Line 45, "C(1,1)." should read -- $\underline{C}(1,1)$. --

Lines 52 and 62, "$C^{-1}$" should read -- $\underline{C}^{-1}$ --

CERTIFICATE OF CORRECTION (continued)
U.S. Pat. No. 7,308,467 B2

Column 11,

Lines 20, 26 and 42, "C" should read -- $\underline{C}$ --

Line 28, "C(2,1)–" should read -- $\underline{C}(2,1)$- --

Line 30, "C(2,1)" should read -- $\underline{C}(2,1)$ --

Line 44, "(C C$^{-1}$)" should read -- $(\underline{C}\,\underline{C}^{-1})$ --

Lines 48 and 55, "C$^{-1}$" should read -- $\underline{C}^{-1}$ --

Column 12,

Lines 8, 12 and 17, "C$^{-1}$" should read -- $\underline{C}^{-1}$ --

Lines 48 and 54, "C" should read -- $\underline{C}$ --

Line 56, "C(3,1)" should read -- $\underline{C}(3,1)$- --

Line 57, "C(3,1)" should read -- $\underline{C}(3,1)$ --

Column 13,

Lines 7, 13, 21, 32, 36 and 41, "C$^{-1}$" should read -- $\underline{C}^{-1}$ --

Line 8, "C" should read -- $\underline{C}$ --

Line 9, "(C C$^{-1}$)" should read -- $(\underline{C}\,\underline{C}^{-1})$ --

Line 57, "C$_{ij}$" should read -- $\underline{C}_{ij}$ --

Line 57 and 61, "C" should read -- $\underline{C}$ --

Line 59, " $C_{ij} := const \cdot \left( -|t_j - t_i|^{\beta+1} + |t_{j-1} - t_i|^{\beta+1} + |t_j - t_{i-1}|^{\beta+1} - |t_{j-1} - t_{i-1}|^{\beta+1} \right)$
$i, j = 1, \ldots, n$ " should read -- $\underline{C}_{ij} := const \cdot \left( -|t_j - t_i|^{\beta+1} + |t_{j-1} - t_i|^{\beta+1} + |t_j - t_{i-1}|^{\beta+1} - |t_{j-1} - t_{i-1}|^{\beta+1} \right)$
$i, j = 1, \ldots, n$ --

Lines 60 and 67, "C$^{-1}$" should read -- $\underline{C}^{-1}$ --

CERTIFICATE OF CORRECTION (continued)  
U.S. Pat. No. 7,308,467 B2

Page 4 of 4

Column 15,

Lines 5, 17 and 18, "C⁻¹" should read -- $\underline{C}^{-1}$ --

Line 16, " $C_{\bullet,n}^{-1}$ " should read -- $\underline{C}_{\bullet,n}^{-1}$ --

Line 17, " $C_{n,n}^{-1}$ " should read -- $\underline{C}_{n,n}^{-1}$ --

Column 16,

Line 21, "C$_{ij}$" should read -- $\underline{C}_{ij}$ --

Lines 21 and 25, "C" should read -- $\underline{C}$ --

Line 23, " $$C_{ij} := const \cdot \left( -|t_j - t_i|^{\beta+1} + |t_{j-1} - t_i|^{\beta+1} + |t_j - t_{i-1}|^{\beta+1} - |t_{j-1} - t_{i-1}|^{\beta+1} \right)$$
$$i,j = 1,\ldots,n$$
" should read -- $$\underline{C}_{ij} := const \cdot \left( -|t_j - t_i|^{\beta+1} + |t_{j-1} - t_i|^{\beta+1} + |t_j - t_{i-1}|^{\beta+1} - |t_{j-1} - t_{i-1}|^{\beta+1} \right)$$
$$i,j = 1,\ldots,n$$
--

Lines 24, 30 and 47, "C⁻¹" should read -- $\underline{C}^{-1}$ --

Line 45, " $C_{\bullet,n}^{-1}$ " should read -- $\underline{C}_{\bullet,n}^{-1}$ --

Line 47, " $C_{n,n}^{-1}$ " should read -- $\underline{C}_{n,n}^{-1}$ --

UNITED STATES PATENT AND TRADEMARK OFFICE
CERTIFICATE OF CORRECTION

| | | |
|---|---|---|
| PATENT NO. | : 7,308,467 B2 | Page 1 of 10 |
| APPLICATION NO. | : 10/601537 | |
| DATED | : December 11, 2007 | |
| INVENTOR(S) | : Denk et al. | |

It is certified that error appears in the above-identified patent and that said Letters Patent is hereby corrected as shown below:

Please delete column 1 line 1 through column 18 line 11 and insert column 1 line 1 through column 18 line 5 as attached.

Signed and Sealed this
Twenty-eighth Day of December, 2010

David J. Kappos
*Director of the United States Patent and Trademark Office*

METHOD FOR ON-DEMAND GENERATION OF INDIVIDUAL RANDOM NUMBERS OF A SEQUENCE OF RANDOM NUMBERS OF A 1/F NOISE

CROSS-REFERENCE TO RELATED APPLICATIONS

This application is a continuation of copending International Application No. PCT/DE01/04376, filed Nov. 22, 2001, which designated the United States and was not published in English.

BACKGROUND OF THE INVENTION

Field of the Invention

The invention relates to a method for generating sequences of random numbers of a 1/f noise.

Random numbers of a 1/f noise can be used, for example, in a transient circuit simulation that takes account of noise influences. The 1/f noise is understood as a stochastic process with a specific frequency spectrum that can be described by the equation $$S(f) \propto \frac{1}{f^\beta}, \beta \in ]0,1[.$$

1/f noise sources are suitable for modeling noise influences in a multiplicity of technical and physical systems, and for systems for estimating and forecasting events on the financial markets. In particular, many electronic components such as, for example, pn diodes and MOS field-effect transistors exhibit 1/f noise sources.

It is possible to approximate 1/f noise sources by carrying out a summation of the effects of many noise sources which each exhibit a Lorentz-spectrum as a frequency spectrum. Such noise sources can be modeled, for example, by the system response of a linear time-invariant system, which can also be denoted as an LTI-system, at whose system input white noise is applied. It is disadvantageous in this mode of procedure for the dimension of the system of differential equations that are solved numerically to be excessively inflated. The result of this is long computing times and a high storage requirement of a computer system that is used to simulate a system that is subject to the influence of 1/f noise.

SUMMARY OF THE INVENTION

It is accordingly an object of the invention to provide a method for on-demand generation of individual random numbers of a sequence of random numbers of 1/f noise that overcomes the above-mentioned disadvantages of the prior art methods of this general type, which can be carried out quickly and with a low computational outlay. It is also an object of the invention to specify an improved method for simulating a technical system that is subject to 1/f noise. Finally, the aim is also to specify a computer system having a computer program for determining sequences of random numbers of 1/f noise that can be executed quickly and that lays claim to only a few resources of a computer system.

In accordance with the invention, the problem of noise simulation in the modeling of the system to be simulated is transformed into the problem of generating a random number sequence. In accordance with the invention, the correlations of the random numbers are determined, and this is used for a simple and accurate generation of the corresponding random number sequences.

The method according to the invention for generating at least one sequence of random numbers of 1/f noise first provides the following steps in this case:

a) determining a desired spectral value $\beta$; and
b) determining an intensity constant const.

Characteristics of the 1/f noise to be simulated are thereby fixed.

As a result, the number of random numbers of the 1/f noise that are to be generated, and a starting value for a running variable n used for the simulation are fixed.

Until the desired number of elements $y(n)$ of one or more vectors $\underline{y}$ of length n are calculated from 1/f-distributed random numbers, the invention provides the loop-type repetition of the following steps:

a) increasing a current value of a running variable n by 1;
b) fixing a simulation time step $[t_{n-1}; t_n]$;
c) determining an element $\underline{C}_{ij}$ of a covariance matrix $\underline{C}$ of dimension (n×n) according to:

$$\underline{C}_{ij} := const \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1});$$

$$i, j = 1, \ldots, n$$

d) determining a matrix $\underline{C}^{-1}$ by inverting the covariance matrix $\underline{C}$;
e) determining a variable $\sigma$ in accordance with the rule $$\sigma = sqrt(1/e(n,n)),$$

where sqrt denotes the "square root" function, and $e(n,n)$ denoting the element of the inverted covariance matrix $\underline{C}^{-1}$ indexed by (n,n);

f) determining a (0,1)–normally distributed random number which forms the nth component of a vector $\underline{x}$ of length n;
g) forming a variable $\mu$ from the first (n−1) components of the nth row of the inverted covariance matrix $\underline{C}^{-1}$ and the (n−1) elements of the vector $\underline{y}$ which were calculated for a preceding (n−1) simulation time step, specifically in accordance with the following rule:

$$\mu := -\frac{\underline{y}_{(n-1)}^T \cdot \underline{C}_{*,n}^{-1}}{\underline{C}_{n,n}^{-1}}$$

$\underline{y}_{(n-1)}$ denoting the first (n−1) components of the vector $\underline{y}$,
$\underline{C}_{*,n}^{-1}$ denoting the first (n−1) components of the nth row of the inverted covariance matrix $\underline{C}^{-1}$, and $\underline{C}_{n,n}^{-1}$ denoting the element of the inverted covariance matrix $\underline{C}^{-1}$ indexed by (n,n); and h) calculating an element $y(n)$ of the vector $\underline{y}$ of length n from 1/f-distributed random numbers according to the following rule:

$$Y(n) = x(n) \cdot \sigma + \mu.$$

Simulations of technical systems can be arbitrarily lengthened with the aid of the method according to the invention. It is possible for this purpose to generate additional 1/f-distributed random numbers in a simple way when already generated 1/f-distributed random numbers are to hand. Moreover, a simulation can be based on results of previously simulated time intervals. This so-called restart capability constitutes a very important property for the practice of simulation. It is precisely for 1/f noise sources that this can be achieved only with difficulty, because random numbers that simulate a 1/f noise source for a specific time interval depend on random numbers for earlier time intervals that have already been determined numerically. The present invention also permits the use of an adaptive step size control without thereby significantly increasing the computation times for the simulation of the technical system. Such an adaptive step size control considerably increases the precision and the computation time efficiency in the numerical determination of the dynamic performance of a simulated technical system.

It is no longer necessary in the case of the method according to the invention to prescribe the time interval to be simulated. Precisely by the provision of variable step sizes, it is also possible to perform an adaptation to current system dynamics, and this increases the accuracy of the simulations.

The present invention specifies a method for generating sequences of 1/f-distributed random numbers successively, that is to say element by element. In this case, the method ensures that each newly generated random number depends in a correct way in the stochastic sense on the previously generated 1/f-distributed random numbers. It is thereby possible to generate the respectively required random numbers in the course of the numerical simulation of a circuit.

The invention uses the theory of conditional probability density in order to generate a 1/f-distributed random number that correctly ensures the stochastic relationship of the random number with the already generated random numbers required for preceding simulation steps.

In a particularly advantageous refinement of the method according to the invention, q sequences of random numbers of a 1/f noise are calculated simultaneously, instead of the steps to be repeated in the loop-type fashion:

a) determining a (0,1)–normally distributed random number which forms the nth component of a vector $\underline{x}$ of length n;

b) forming a variable u from the first (n−1) components of the nth row of the inverted covariance matrix $\underline{\underline{C}}^{-1}$ and the (n−1) elements of the vector $\underline{y}$ which were calculated for a preceding (n−1) simulation time step, specifically in accordance with the following rule:

$$\mu = -\frac{y_{(n-1)}^T \cdot \underline{C}^{-1}_{\cdot,n}}{\underline{C}^{-1}_{n,n}}$$

where $y_{(n-1)}$ denotes the first (n−1) components of the vector $\underline{y}$, $\underline{C}^{-1}_{\cdot,n}$ denotes the first (n−1) components of the nth row of the inverted covariance matrix $\underline{\underline{C}}^{-1}$, and $\underline{C}^{-1}_{n,n}$ denotes the element of the inverted covariance matrix $\underline{\underline{C}}^{-1}$ indexed by (n,n); and c) calculating an element y(n) of a vector $\underline{y}$ of length n from 1/f-distributed random numbers according to the following rule:

$$Y(n) = x(n)\cdot\sigma + \mu,$$

the following steps are provided:

d) determining a quantity q of (0,1)–normally distributed random numbers $x_{k,n}$ which form the respective last component of the vectors $\underline{x}_k$ of length n, k=1,..., q. It is to be borne in mind in this case that the respective first (n−1) components of the vectors $\underline{x}_k$ have already been calculated previously in the step.

e) forming q variables $\mu_k$ in accordance with the following rule:

$$\mu_k := -\frac{y_{(n-1),k}^T \cdot \underline{C}^{-1}_{\cdot,n}}{\underline{C}^{-1}_{n,n}}$$

$y_{(n-1),k}$ denotes the first (n−1) components of the vector $\underline{y}_k$ that were calculated for a preceding simulation time step. $\underline{C}^{-1}_{\cdot,n}$ denotes the first (n−1) components of the nth row of the inverted covariance matrix $\underline{\underline{C}}^{-1}$ and $\underline{C}^{-1}_{n,n}$ denotes the element of the inverted covariance matrix $\underline{\underline{C}}^{-1}$ indexed by (n,n). This is carried out for k=1,..., q.

f) calculating q elements $y_{k,n}$ which form the respective nth component of the vector $\underline{y}_k$ of length n from 1/f-distributed random numbers, specifically according to the following rule:

$$y_{k,n} = x_{k,n}\cdot\sigma + \mu_k,$$

$$k=1,\ldots,q.$$

The q vectors $\underline{y}_k$ (k=1,..., q) of length n from 1/f-distributed random numbers are arranged with particular advantage in a NOISE matrix and specify in a simulation the 1/f noise influences of a system to be simulated.

In accordance with the invention, the concept for simulating 1/f noise is based according to the invention on the following train of thought. The dynamic performance of a system that is exposed to stochastic influences is modeled adequately by a stochastic process. In order to simulate such a system dynamics, the general approach is to calculate numerically individual random realizations (so-called paths) of the fundamental stochastic processes. Simulating systems with 1/f noise sources requires paths of stochastic integrals of the form $$\int_0^t Y(s)\eta_{\frac{1}{f}}(s)ds$$

(s)ds to be calculated numerically. Here, s is an integration variable and t (upper integration limit) denotes the time, $$\eta_{\frac{1}{f}}(s)ds$$

(s)ds denotes a 1/f noise source, and Y(s) a stochastic process that describes the temporal dynamics of a variable, for example the electric voltage in the circuit simulation.

Using $B_{FBM}(s)$ to denote that stochastic process whose derivative (mathematically: derivative in the distribution sense) yields the 1/f noise process $$\eta_{\frac{1}{f}}(s),$$

it is possible to write the stochastic integral to be calculated as $$\int_0^t Y(s)\eta_{\frac{1}{f}}(s)\,ds = \int_0^t Y(s)dB_{FBM}(s) \qquad (1.1)$$

The integral on the right-hand side is to be interpreted as a Riemann-Stieltjes integral of the stochastic process Y(s) with the process $B_{FBM}(s)$ as an integrator. This integral can be approximated by a sum by decomposing the integration interval [0,t] in accordance with $0 \equiv t_0 < t_1 < \ldots < t \equiv t$ into n disjoint subintervals $[t_i, t_{i-j}]$, i=1, n:

$$\int_0^t Y(s)dB_{FBM}(s) = \sum_{[illegible]}^n Y(t_{i-1})[B_{FBM}(t_i) - B_{FBM}(t_{i-1})] \qquad (1.2)$$

This sum is a random variable. The dependence on the result ω of the random experiment has been consistently omitted.

A process $B_{FBM}(s)$ whose generalized derivative has a 1/f spectrum is known in the literature under the name of 'Fractional Brownian Motion'. $B_{FBM}(s)$ is a Gaussian stochastic process and is completely characterized as such by its expectation $$E(B_{FBM}(s)) = 0 \; \forall s \in R \qquad (1.3)$$

and by its covariance function $$Cov(B_{FBM}(s),B_{FBM}(t)) = const \cdot (|s|^{\beta+1} + |t|^{\beta+1} - |t-s|^{\beta+1}) \qquad (1.4)$$

The method according to the invention for on-demand generation of suitable random numbers essentially reduces the simulation of 1/f noise influences to the generation of realizations of the random variables $[B_{FBM}(t_i) - B_{FBM}(t_{i-1})]$, that is to say to the generation of increments of Fractional Brownian Motion.

The present invention permits the online generation of the required realizations of the random variables: $\Delta B_{FBM}(i)$, that is to say in the course of the successive integration of the system equations. This results in two requirements placed on the method:

(a) The length n of the sequence of random numbers $\{\Delta B_{FBM}(1), \ldots, \Delta B_{FBM}(n)\}$ must remain variable during a simulation run. In particular, it must be possible at any time to lengthen the simulation (restart capability). This implies the capability of the method to generate the additional random numbers required for this purpose such that they are correlated in a correct way with the subsequence already generated.

(b) Let ti be the currently attained time in the course of a simulation. It must then be possible to determine the time interval $[t_i, t_{i+1}]$, that is to say the step size of the next integration step, from the instantaneous system dynamics—that is to say adaptively.

The invention meets both requirements by specifying a rule as to how a realization of $\{\Delta B_{FBM}(1), \ldots, \Delta B_{FBM}(n)\}$, that is to say a sequence of random numbers, can be generated successively, that is to say element by element. The step size $\Delta t_i := t_i - t_{i-1}$ can be freely selected in this case for each new random number.

The first step is to investigate the approach for so-called "conditional densities".

The first step is to consider the distribution of the random variable vectors $(\Delta B_{FBM}(1), \ldots, \Delta B_{FBM}(n))$.

Since the individual random variables $\Delta B_{FBM}(i)$ represent increments of a Gaussian stochastic process, the random variable vector $(\Delta B_{FBM}(1), \ldots, \Delta B_{FBM}(n))$ determines an n-dimensional Gaussian-distributed random variable, and thus completely defined by its (n-dimensional) expectation E and its covariance matrix $\underline{C}$. The two variables can be calculated from the formulas (1.3) and (1.4) as $$E(\Delta B_{FBM}(i)) = 0, i = 1, \ldots, n \qquad (3.5)$$

$$\underline{C}_{i,j} := Cov(\Delta B_{FBM}(i), \Delta B_{FBM}(j)) = \qquad (3.6)$$
$$const \cdot (-|t_j - t_i|^{\beta+1} + |t_{j-1} - t_i|^{\beta+1} +$$
$$|t_j - t_{i-1}|^{\beta+1} - |t_{j-1} - t_{i-1}|^{\beta+1}), i, j = 1, \ldots, n$$

The online method according to the invention is now to be specified in the form of a complete induction.

The basis of the induction—and thus the starting point of the method—is the realization of a real Gaussian distribution with expectation 0 and variance $\Sigma_{1,1} = 2 \cdot const \cdot |\Delta t_1|^{\beta+1}$.

It must be specified for the purpose of inductive influence how to expand a realization of $(\Delta B_{FBM}(1), \ldots, \Delta B_{FBM}(n-1))$ by a realization of $\Delta B_{FBM}(n)$ so as to produce overall a realization of $(\Delta B_{FBM}(1), \ldots, \Delta B_{FBM}(n))$. In order to simplify the notation, the already "cubed" subsequence of random numbers may be denoted by $(y_1, \ldots y_{n-1}) =: y_{(n-1)}^T$ and the realization, still to be cubed, of $\Delta B_{FBM}(n)$ may be denoted by $y_n$.

The problem can now be formulated as now described.

Let there be given an n-dimensional zero mean Gaussian random variable Z with the covariance matrix $\underline{C}$. Let the first n−1 elements of a realization of Z be already cubed and known in the form of a random number vector $\underline{y}_{(n-1)}$.

The aim is now to find the distribution from which the nth element $y_n$ must be taken in order to complete $\underline{y}_{(n-1)}$ to form a realization $\underline{y} = (\underline{y}_{(n-1)}, y_n)$ of Z.

A solution to this task can be found when the conditional probability density $f(y_n | \underline{y}_{(n-1)})$ are considered for $y_n$—with the condition that $\underline{y}_{(n-1)}$ already holds. This variable can be calculated in the present case of a Gaussian normal distribution as $$f(y_n | \underline{y}_{(n-1)}) = \frac{1}{\sqrt{2\pi \underline{C}_{n,n}^{-1}}} \exp\left\{ -\frac{1}{2\underline{C}_{n,n}^{-1}} (y_n - \mu)^2 \right\} \qquad (3.7)$$

The variable $\underline{C}_{n,n}^{-1}$ is yielded in this case from the following notation of the inverted covariance matrix $\underline{C}^{-1}$ as:

$$\underline{C}^{-1} = \left( \begin{array}{c|c} \underline{C}_{(n-1)}^{-1} & \underline{C}_{*,n}^{-1} \\ \hline \underline{C}_{n,*}^{-1} & \underline{C}_{n,n}^{-1} \end{array} \right). \qquad (3.8)$$

where $\underline{C}_{(n-1)}^{-1} \in R^{(n-1) \times (n-1)}$, where $\underline{C}_{*,n}^{-1} \in R^{(n-1)}$ and where $\underline{C}_{n,n}^{-1} \in R$.

The variable $\mu$ stands for $$\mu := -\frac{y_{(n-1)}^T C_{*,n}^{-1}}{C_{n,n}^{-1}}. \qquad (3.9)$$

The conditional density $f(y_n|y_{(n-1)})$ is therefore the probability density of a Gaussian normal distribution with a mean of $\mu$ and variance of $$\frac{1}{C_{n,n}^{-1}}.$$

It must hold that $C_{n,n}^{-1} \neq 0$ in order for the above variance to exist. This is ensured on the basis of the following argumentation. Let $C$ and $C^{-1}$ have the same characteristic directions and inverse eigenvalues. An eigenvalue 0 of the matrix $C^{-1}$ would therefore have an infinite variance of the random variable vector $(\Delta B_{FBM}(1), \ldots, \Delta B_{FBM}(n))$ as a consequence. It may therefore be presupposed that all the eigenvalues of $C^{-1}$ are nonvanishing. Since the eigenvalues of $C^{-1}$ are non-negative, in any case, it therefore holds that: The matrix $C^{-1}$ is symmetrical and positively defined. It is possible by renaming the coordinate axes to bring this matrix from the form (3.8) to the following form:

$$C^{-1} := \begin{pmatrix} C_{*,n}^{-1} & (C_{*,n}^{-1})^T \\ C_{*,n}^{-1} & C_{(n-1)}^{-1} \end{pmatrix} \qquad (3.10)$$

This matrix is likewise symmetrical and positively defined per constructionem. In accordance with the Sylvester criterion for symmetrical and positively defined matrices, it follows therefrom that $(C^{-1})_{1,1} = C_{n,n}^{-1} > 0$, and the assertion is demonstrated.

The method according to the invention reduces a simulation of $$\frac{1}{f}$$

noise sources to the generation of Gaussian-distributed random numbers.

The inverted covariance matrix $C^{-1}$ (an n×n matrix) is required in order to generate a random number $y_n$ that is correlated in the way required with an already generated sequence $y_{(n-1)}$. Strictly speaking, all that is required is knowledge of the nth row of this matrix, that is to say knowledge of $$((C_{*,n}^{-1})^T, C_{n,n}^{-1}).$$

As is to be read from formula (3.6), the covariance matrix $C$ depends on the decomposition of the simulation interval $[0, t_n]$ into disjoint subintervals (step sizes) $[t_{i-1}, t_i]$. In particular, the last column of $C$ depends on $t_n$ (doing so identically with the last row because of the symmetry of $C$), and thus on the current step size $\Delta t_n = t_n - t_{n-1}$.

The left-hand upper (n−1)×(n−1) submatrix $\tilde{C}$ of the n×n covariance matrix $C$ is precisely the covariance matrix for a random number sequence of length n−1. This covariance matrix had already to be determined and inverted for calculating $y(n−1)$ or for calculating the last element $(y_{n-1})$. In order to accelerate the method, it is therefore possible to have recourse to an incremental method for matrix inversion, for example by use of the Schur complement.

The invention is also implemented in a method for simulating a technical system that is subject to 1/f noise. In this case, random numbers that have been determined with the aid of a method according to the invention are used in modeling and/or fixing the variables present on the input channels of the system.

Also provided is a computer system and/or a computer program for determining sequences of random numbers of a 1/f noise, or for executing the other methods according to the invention. The invention is also implemented in a data medium having such a computer program. Furthermore, the invention is implemented in a method in which a computer program according to the invention is downloaded from an electronic data network, such as from the Internet, for example, on a computer connected to the data network.

Other features which are considered as characteristic for the invention are set forth in the appended claims.

Although the invention is illustrated and described herein as embodied in a method for on-demand generation of individual random numbers of a sequence of random numbers of 1/f noise, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a technical system to be simulated;

FIG. 2 is a structogram for determining sequences of random numbers of 1/f noise;

FIGS. 3A-3F show calculation examples for a first simulation time step;

FIGS. 4A-4F show calculation examples for a second simulation time step; and

FIGS. 5A-5F show calculation examples for a third simulation time step.

DESCRIPTION OF THE PREFERRED EMBODIMENTS

Referring now to the figures of the drawing in detail and first, particularly, to FIG. 1 thereof, there is shown a schematic diagram of a noisy system that is to be simulated.

The system is described by a system model 1 that is indexed as a box and describes the system behavior. The system behavior results from input channels 2, which are also designated as vector INPUT and from output channels 3, which are also designated as OUTPUT. Furthermore, a system-dictated noise is provided, which is present on noise input channels 4 and which is also designated as a vector or as a matrix NOISE. The matrix NOISE is present when the noise is taken into account with a plurality of channels, each column of the matrix NOISE containing a vector of noise values which are present on a noise input channel.

The noise on the noise input channels 4 is preferably interpreted as a noise-dictated alteration of the system model 1.

The behavior of the input channels 2 and of the output channels 3 can be described by a system of differential equations or by a system of differential-algebraic equations, so that reliable predictions of the system behavior are possible.

For each time step of the simulation of the system shown in FIG. 1, a vector OUTPUT of the output channels 3 is calculated for a vector INPUT present on the input channels 2 and for a vector NOISE present on the noise input channels 4.

For the simulation over a relatively long period of time, the vectors INPUT, OUTPUT, NOISE are expediently specified as a matrix, a respective column k of the relevant matrix containing the values of the corresponding time series of the relevant INPUT, OUTPUT, NOISE.

FIG. 2 illustrates how a respective vector $y_k$ is attained which forms a column k of the matrix NOISE for the noise input channels 4 of the system model 1. Each vector $y_k$ serves for simulating a noise source.

In a first step, a desired spectral value $\beta$, and an intensity constant const are fixed. Furthermore, a counter n of the current simulation time interval is set to 0. The following sequence of computation steps is then carried out successively for each simulation time step.

First, the current simulation time step is fixed. Equivalently to this, it is also possible to fix the end of the current simulation time step, thereby producing the next point in time under consideration.

Afterward, the counter n of the current simulation time step is incremented by one.

The covariance matrix $\underline{C}$ of dimension (n×n) is subsequently determined according to equation (3.6).

This is followed by the step of inverting the matrix $\underline{C}$, for example by use of a Cholesky decomposition. In order to raise the efficiency, it is also possible in this case to appeal to the inverse matrix of the previous step, for example by using Schur complement techniques.

Next, the variable $\sigma$ is calculated from the formula $$\sigma = sqrt(1/e(n,n))$$

where sqrt denotes the "square root" function and where e(n,n) denotes that element of the inverted covariance matrix $\underline{C}^{-1}$ which is indexed by (n,n).

In addition, a value of a (0,1)-normally distributed random variable $X_k$ is extracted and the vector $x_k$ of the normally distributed random numbers is thereby supplemented. The extracted random number has the expectation of 0 and the variance of 1. This step is carried out for each noise source to be simulated.

Furthermore, a variable $\mu_k$ is formed. It is formed from the first (n−1) components of the nth row of the inverted covariance matrix $\underline{C}^{-1}$ and from the sequence of (n−1) 1/f-distributed random numbers which were calculated for the preceding (n−1) simulation time steps.

For this purpose, the procedure is in accordance with formula (3.9). This step is carried out for each noise source k to be simulated.

Finally, that element of the matrix NOISE is calculated whose column index k specifies the noise source to be simulated and whose row index is equal to n. The current simulation time step is denoted by this. The currently calculated element r(k,n) of the matrix NOISE represents a random number which, together with the superjacent (n−1) elements of the same column k of NOISE, forms a vector $y_k$ of length n from 1/f-distributed random numbers. The vector $y_k$ serves for simulating one of the noise sources for the first n simulation time steps.

Each element $y_k$ of the nth row of NOISE is then determined, on the basis of equations (3.7)–(3.9), from the last random number $x_k$ of the vector x and the variables $\mu_x$ and $\sigma$, to be precise according to the following rule:

$$y_k = x_k \cdot \sigma + \mu_x.$$

FIGS. 3A to 5F depict exemplary embodiments reproducing concrete results of calculation.

The value of the spectral value $\beta$ is always adopted in this case as 0.5. The value of the intensity const is arbitrarily adopted as 1.0. Three random numbers are simultaneously processed in each case in accordance with the simulation of three noise sources simultaneously acting, on separate channels, on the system to be simulated and which are disposed in a vector $y_k$, k being an integral value from 1 to 3.

FIGS. 3A-3F show a calculation example for a first simulation time step $[t_0,t_1]=[0,0.5]$.

FIG. 3A shows the covariance matrix $\underline{C}$ of dimension 1×1 for generating a 1/f-distributed random number in the case of the simulation step size. $\underline{C}$ represents here only a scalar with the value 0.70, because $\underline{C}(1,1)$—that is to say with i=j=1— results upon applying equation (3.6) as $$1.0 \cdot (-|t_1-t_1|^{0.5+1}+|t_{1-1}-t_1|^{0.5+1}+|t_1-t_{1-1}|^{0.5+1}-|t_{1-1}-t_{1-1}|^{0.5+1})=0+0.5^{1.5}+0.5^{1.5}-0=0.707106\ldots;$$

FIG. 3B shows the inverse of the covariance matrix $\underline{C}$ from FIG. 3A, something which was performed here by use of a Cholesky decomposition not illustrated in more detail here. A check of $(\underline{C} \cdot \underline{C}^{-1})=(0.707106\ldots 0.707106\ldots^{-1})$ yields the correct value 1, and this illustrates the correctness of the value for $\underline{C}(1,1)$.

FIG. 3C shows a variable $\sigma$ for the first simulation step n=1. This is yielded from the equation $$\sigma = sqrt(1/0.707106\ldots),$$

sqrt denoting the square root and e(1,1) denoting the element 0.707106 . . . , indexed by (1,1), of the inverted covariance matrix $\underline{C}^{-1}$.

FIG. 3D shows three values $x_1, x_2, x_3$ of a (0,1)–normally distributed random variable $X_k$ for one noise source to be simulated in each case. These values form the first element of one vector $x_k$ each of the normally distributed random numbers. The extracted random numbers have the expectation of 0 and the variance of 1.

FIG. 3E shows three variables $\mu_k$ for each of the three noise sources to be simulated. The variable $\mu_k$ is yielded in accordance with formula (3.9) from the first (n−1) components of the nth row of the inverted covariance matrix $\underline{C}^{-1}$ as well as from the sequence of (n−1) 1/f-distributed random numbers that were calculated for the preceding (n−1) simulation time steps. In the first simulation step, these two vectors each have the length 0. It therefore follows for all the variables $\mu_k$ in the first simulation step that: $\mu_k=0$.

FIG. 3F shows three vectors $y_k$ of length 1 of 1/f-distributed random numbers that simulate the behavior of three 1/f-distributed noise sources of the first simulation time step [0, $t_1$]=[0, 0.5]. The matrix NOISE is yielded from the three vectors $y_k$. The value k is an integral value of from 1 to 3 in this case. Each element $y_k$ of the first row of NOISE is determined on the basis of equations (3.7)–(3.9) according to the following rule from the last random number $x_k$ of the associated vector $\underline{x}$ and the variables $\mu_k$ and $\sigma_1$. For example, the first element $y_1(n=1)$ of the first vector $\underline{y}_1$ is calculated as follows:

$$\underline{y}_1(n=1)=\underline{x}_1(n=1)\ast\sigma+\mu_1=-0.35\ldots$$
$$\ast 0.84\ldots+0.00\ldots=-0.30\ldots$$

$\underline{y}_2(n=1)$ and $\underline{y}_3(n=1)$ are calculated by analogy herewith.

With the aid of FIGS. 4A to 4F, there is shown a calculation example of a second simulation time step $[t_1, t_2]=[0.5, 0.75]$. The value n for the second simulation time step is always equal to 2.

FIG. 4A shows the covariance matrix $\underline{\underline{C}}$ of dimension (n×n)=2×2, which is required for generating one further random number each per noise source. Together with the result in accordance with FIG. 3F, the random number thus newly generated forms a vector $\underline{y}_k$ of length 2 from 1/f-distributed random numbers. A vector $\underline{y}_k$ is generated in this case for each noise source. The covariance matrix $\underline{\underline{C}}$ is determined in this case according to equation (3.6).

For example, this is carried out at the element $\underline{\underline{C}}(2,1)$—that is to say with i=2 and j=1. From applying equation (3.6), $\underline{\underline{C}}(2,1)$ is yielded as $$1.0\cdot(-|t_1-t_2|^{0.5+1}+|t_{1-1}-t_2|^{0.5+1}+$$
$$|t_1-t_{2-1}|^{0.5+1}-|t_{1-1}-t_{2-1}|^{0.5+1})=$$
$$(-|0.5-0.75|^{0.5+1}+|0-0.75|^{0.5+1}+$$
$$|0.5-0.5|^{0.5+1}-|0-0.5|^{0.5+1})=$$
$$-0.125+0.6495\ldots+0-0.3535\ldots=0.1709\ldots$$

FIG. 4B shows the inverse of the covariance matrix $\underline{\underline{C}}$ from FIG. 4A. A check (not illustrated here) of the condition ($\underline{\underline{C}}$ $\underline{\underline{C}}^{-1}$) yields a matrix of dimension 2×2, in the case of which the elements indexed by (1,1) and (2,2) are equal to 1. The other elements have the value 0.

FIG. 4C shows a variable $\sigma$ that is calculated from the inverted covariance matrix $\underline{\underline{C}}^{-1}$ of step 4B. The variable $\sigma$ is yielded as $$\sigma=sqrt(1/e(n,n))=sqrt(1/e(2,2))=sqrt(1/4.$$
$$79\ldots)=0.45\ldots;$$

sqrt denoting the square root, and e(2,2) denoting the element, indexed by (2,2) of the inverted covariance matrix $\underline{\underline{C}}^{-1}$ from FIG. 4B.

FIG. 4D shows three vectors $\underline{x}_k$ of independent (0,1)–normally distributed random numbers, the vectors $\underline{x}_k$ each having a length of 2. A (0,1)–normally distributed random variable $x_k$ is extracted per noise source to be simulated. The extracted random number in each case has the expectation of 0 and the variance of 1. The vectors $\underline{x}_k$ of the normally distributed random numbers from FIG. 3D are thereby supplemented such that the vectors $\underline{x}_k$ of the normally distributed random numbers from FIG. 4D result.

FIG. 4E shows three variables $\mu_k$ that were calculated from the inverted covariance matrix $\underline{\underline{C}}^{-1}$ in accordance with step 4B and from the three random numbers in accordance with step 3F. For each noise source to be simulated, the variable $\mu_k$ is calculated from the (n−1) first components of the nth row of the inverted covariance matrix $\underline{\underline{C}}^{-1}$ and from the sequence of a quantity (n−1) of 1/f-distributed random numbers that were calculated in accordance with formula (3.9) for the preceding (n−1) simulation time steps. In the second simulation step, the variable $\mu_k$ is thus calculated from the first component of the second row of $\underline{\underline{C}}^{-1}$ as well as from the first component of the vector $\underline{y}_k$. This is carried out, for example, with the aid of the value $\mu_1$:

$$\mu_1 = \frac{\underline{y}_{n-1,1}^T \cdot \underline{\underline{C}}^{-1}_{\cdot,n}}{\underline{\underline{C}}^{-1}_{n,n}} =$$
$$= \frac{-0.30\ldots\cdot-1.15\ldots}{4.79\ldots} =$$
$$= -0.07\ldots.$$

FIG. 4F shows three vectors $\underline{y}_k$ of length 2 with 1/f-distributed random numbers that simulate the behavior of three 1/f-distributed noise sources for the second simulation time step $[t_1, t_2]=[0.5, 0.75]$. The matrix NOISE is yielded from the three vectors $\underline{y}_k$. The value k is an integral value of from 1 to 3 in this case. Each element $y_k$ of the second row of NOISE is determined on the basis of equations (3.7)–(3.9) according to the following rule from the last random number $x_k$ of the associated vector $\underline{x}$ and the variables $\mu_k$ and $\sigma$. By way of example, the second element $\underline{y}_1(n=2)$ of the first vector $\underline{y}_1$ is calculated below:

$$\underline{y}_1(n=2)=\underline{x}_1(n=2)\ast\sigma+\mu_1=-0.39\ldots\ast 0.45\ldots$$
$$-0.07\ldots=-0.10\ldots$$

With the aid of FIGS. 5A-5F, there is shown a calculation example for a third simulation time step $[t_2, t_3]=[0.75, 1.25]$. The value n is always equal to 3 during the third simulation time step.

FIG. 5A shows the covariance matrix C of dimension (n×n)=3×3, which is required for generating one further random number each per noise source. Together with the result in accordance with FIG. 4F, the random number thus newly generated forms a vector $\underline{y}_k$ of length 3 from 1/f-distributed random numbers. A vector $\underline{y}_k$ is generated in this case for each noise source. The covariance matrix $\underline{\underline{C}}$ is determined in this case according to equation (3.6).

For example, this is carried out at the element $\underline{\underline{C}}(3,1)$—that is to say with i=3 and j=1. From applying equation (3.6), $\underline{\underline{C}}(3,1)$ is yielded as $$1.0\cdot(-|t_1-t_3|^{0.5+1}+|t_{1-1}-t_3|^{0.5+1}+|t_1-t_{3-1}|^{0.5+1}-|t_{1-1}-t_{3-1}|^{0.5+1})=$$
$$=(-|0.5-1.25|^{0.5+1}+|0-1.25|^{0.5+1}+|0.5-0.75|^{0.5+1}-|0-0.75|^{0.5+1})$$
$$=-0.6495\ldots+1.3975\ldots+0.125-0.6495\ldots=0.22\ldots.$$

FIG. 5B shows the inverse $\underline{C}^{-1}$ of the covariance matrix $\underline{C}$ from FIG. 5A. A check (not illustrated here) of the condition ($\underline{C}\,\underline{C}^{-1}$) yields a matrix of dimension 3×3, in the case of which the elements indexed by (1,1), (2,2) and (3,3) are equal to 1. The other elements have the value 0.

FIG. 5C shows a variable σ that is calculated from the inverted covariance matrix $\underline{C}^{-1}$ of step 5B. The variable σ is yielded as $$\sigma = sqrt(1/e(n,n)) = sqrt(1/e(3,3)) = sqrt(1/1.75\ldots) = 0.75\ldots;$$

sqrt denoting the square root, and e(3,3) denoting the element, indexed by (3,3) of the inverted covariance matrix $\underline{C}^{-1}$ from FIG. 5B.

FIG. 5D shows three vectors $\underline{x}_k$ of independent (0,1) normally distributed random numbers, the vectors $\underline{x}_k$ each having a length of 3. A (0,1) normally distributed random variable $x_k$ is extracted per noise source to be simulated. The extracted random number in each case has the expectation of 0 and the variance of 1. The vectors $\underline{x}_k$ of the normally distributed random numbers from FIG. 4D are thereby supplemented such that the vectors $\underline{x}_k$ of the normally distributed random numbers from FIG. 5D result.

FIG. 5E shows three variables $\mu_k$ that were calculated from the inverted covariance matrix $\underline{C}^{-1}$ in accordance with step 5b and from the three random numbers in accordance with step 4f. For each noise source to be simulated, the variable $\mu_k$ is calculated from the (n−1) first components of the nth row of the inverted covariance matrix $\underline{C}^{-1}$ and from the sequence of (n−1) 1/f-distributed random numbers that were calculated in accordance with formula (3.9) for the preceding (n−1) simulation time steps. In the second simulation step, the variable $\mu_k$ is thus calculated from the first two components of the third row of $\underline{C}^{-1}$ as well as from the first two components of the vector $\underline{y}_k$. This is carried out, for example, with the aid of the value $\mu_1$:

$$\mu_1 = \frac{y^T_{(n-1),1} \cdot C^{-1}_{\cdot\cdot,n}}{C^{-1}_{n,n}} = \frac{-0.30\ldots \cdot -0.31\ldots + 0.10\ldots \cdot -0.98}{1.75\ldots}$$

$$= -0.00\ldots$$

FIG. 5F shows three vectors $\underline{y}_k$ of length 3 with 1/f-distributed random numbers that simulate the behavior of three 1/f-distributed noise sources for the third simulation time step [$t_2$, $t_3$]=[0.75, 1.25]. The matrix NOISE is yielded from the three vectors $\underline{y}_k$. The value k is an integral value of from 1 to 3 in this case. Each element $y_k$ of the third row of NOISE is determined on the basis of equations (3.7)–(3.9) according to the following rule from the last random number $x_k$(n=3) of the associated vector $\underline{x}$ and the variables $\mu_k$ and σ. By way of example, the third element $y_1$(n=3) of the first vector $\underline{y}_1$ is calculated below:

$$y_1(n=3) = x_1(n=3) \cdot \sigma + \mu_1 = -0.90\ldots \cdot 0.75\ldots + 0.00\ldots = -0.67\ldots$$

The following conditions remain to be observed for the purpose of concrete execution of the calculation examples shown.

The numerical values shown in FIGS. 3, 4 and 5 reproduce intermediate and final results of the computing steps, described with reference to FIG. 2, for a first, for a second and for a third simulation interval. In this case, after accurate numerical calculation, all values are truncated after the second decimal place following the point in order to be able to reproduce them more effectively. Consequently, when computationally reaccomplishing the exemplary embodiments, it is necessary to calculate further not with the intermediate values shown in the figures, but with the exact intermediate values, in order to reach the specified y vectors starting from the specified x vectors.

Vectors of (0,1) normally distributed random variables are shown in FIGS. 3C, 4C and 5C. In this case, a random variable represents a noise source in each case. For the sake of simplicity, it is not illustrated here how such random numbers are reached with the aid of the expectation of 0 and the variance of 1. This is familiar to the person skilled in the art.

We claim:

1. A computer implemented method for numeric simulation of an electric circuit influenced by noise, comprising the steps of:
   numerically simulating the electric circuit using a model including input channels, noise input channels and output channels, the behavior of the input channels and of the output channels being described by a system of differential equations or a by a system of differential algebraic equations;
   in the numerical simulation step, calculating an output vector for an input vector present on the input channels and a noise vector $\underline{y}$ of 1/f distributed random numbers present on the noise input channel, wherein generation of the noise vector $\underline{y}$ includes the steps of:
   determining a desired spectral value β;
   determining a number of the random numbers of the 1/f noise to be generated;
   determining an intensity constant const;
   setting a starting value for a running variable n;
   performing a loop-type repetition until a desired number of elements y(n) of a vector $\underline{y}$ of length n is calculated from 1/f-distributed random numbers, by the steps of:
   increasing a current value of the running variable n by 1;
   setting a simulation time step [$t_{n-1}$; $t_n$];
   determining elements $C_{ij}$ of a covariance matrix $\underline{C}$ of dimension (n×n) according to:

$$C_{ij} := const \cdot (-|t_j - t_i|^{\beta+1} + |t_{j-1} - t_i|^{\beta+1} + |t_j - t_{i-1}|^{\beta+1} - |t_{i-1} - t_{j-1}|^{\beta+1})$$
$$i,j=1,\ldots,n$$

determining an inverted covariance matrix $\underline{C}^{-1}$ by inverting the covariance matrix $\underline{C}$;
   determining a variable σ in accordance with $$\sigma = sqrt(1/e(n,n)),$$

where sqrt denotes a square root function, and e(n,n) denotes an element of the inverted covariance matrix $\underline{C}^{-1}$ indexed by (n,n);
   determining a (0,1)-normally distributed random number which forms an nth component of a vector $\underline{x}$ of length n;
   forming a variable µ from first (n−1) components of an nth row of the inverted covariance matrix $\underline{C}^{-1}$ and (n−1) elements of the vector $\underline{y}$ calculated for a preceding (n−1) simulation time step, according to:

$$\mu := -\frac{y^T_{(n-1)} \cdot C^{-1}_{\cdot,n}}{C^{-1}_{n,n}}$$

where $y_{(n-1)}$ denotes first (n−1) elements of the vector $\underline{y}$, $\underline{C}_{n}^{-1}$ denotes the first (n−1) components of the nth row of the inverted covariance matrix $\underline{\underline{C}}^{-1}$, and $\underline{C}_{n,n}^{-1}$ denotes a component of the inverted covariance matrix $\underline{\underline{C}}^{-1}$ indexed by (n,n); and calculating an element y(n) of the vector $\underline{y}$ of length n from the 1/f-distributed random numbers, according to:

$$y(n) = x(n) * \sigma + \mu;$$

outputting the at least one sequence of random numbers of 1/f noise.

2. A method for simulating a technical system subject to 1/f noise, which comprises the steps of:
determining random numbers according to claim 1; and
using the random numbers for modeling variables present on input channels of the technical system.

3. A computer system, comprising:
processor programmed for executing the method for determining the sequences of random numbers of the 1/f noise according to claim 2.

4. A computer running a computer program, comprising:
computer-executable instructions for carrying out the method according to claim 1 for determining the sequences of random numbers of the 1/f noise.

5. A computer running the instructions stored on a computer-readable data medium having the computer-executable instructions according to claim 4.

6. A downloading method, which comprises the step of:
downloading the computer program according to claim 4 from an electronic data network onto a computer connected to the electronic data network.

7. The method according to claim 6, which further comprises using the Internet as the electronic data network.

8. A computer system, comprising:
processor programmed for executing the method for determining the sequences of random numbers of the 1/f noise according to claim 1.

9. A method for simulating a technical system subject to 1/f noise, which comprises the steps of:
determining random numbers according to claim 1; and
using the random numbers for fixing variables present on input channels of the technical system; and
simulating the technical system and outputting the result of the simulation.

10. A computer implemented method for numeric simulation of an electric circuit influenced by noise, comprising the steps of:
numerically simulating the electric circuit using a model including input channels, noise input channels and output channels, the behavior of the input channels and of the output channels being described by a system of differential equations or by a system of differential algebraic equations;
in the numerical simulation step, calculating an output vector for an input vector present on the input channels and a noise vector $\underline{y}$ of 1/f distributed random numbers present on the noise input channel, wherein generation of the noise vector $\underline{y}$ includes the steps of:
determining a desired spectral value $\beta$;
determining a number of the random numbers of the 1/f noise to be generated;
determining an intensity constant const;
setting a starting value for a running variable n;
calculating q sequences of the random numbers of the 1/f noise simultaneously, by performing loop-type repetitions until a desired number of elements $y_{k,n}$ of a vector $\underline{y}$ of length n is calculated from 1/f-distributed random numbers, by the steps of:
increasing a current value of the running variable n by 1;
setting a simulation time step $[t_{n-1}; t_n]$;
determining elements $\underline{C}_{ij}$ of a covariance matrix $\underline{\underline{C}}$ of dimension (n×n) according to:

$$\underline{C}_{ij} := const \cdot (-|t_j - t_i|^{\beta+1} + |t_{j-1} - t_i|^{\beta+1} + |t_j - t_{i-1}|^{\beta+1} - |t_{j-1} - t_{i-1}|^{\beta+1}),$$
$$i,j = 1, \ldots, n$$

determining an inverted covariance matrix $\underline{\underline{C}}^{-1}$ by inverting the covariance matrix $\underline{\underline{C}}$;
determining a variable $\sigma$ in accordance with $$\sigma = sqrt(1/e(n,n)),$$

where sqrt denotes a square root function, and e(n,n) denotes an element of the inverted covariance matrix $\underline{\underline{C}}^{-1}$ indexed by (n,n);
determining a quantity q of (0,1)-normally distributed random numbers $x_{k,n}$ which form a respective last component of vectors $\underline{x}_k$ of length n, where k=1, ..., q,
forming q variables $\mu_k$ according to:

$$\mu_k := -\frac{y_{(n-1),k}^T \cdot \underline{C}_{\bullet,n}^{-1}}{\underline{C}^{-1}_{n,n}}$$

where $y_{(n-1),k}$ denotes first (n−1) elements of the vector $\underline{y}_k$ that were calculated for a preceding simulation time step, $\underline{C}_{n}^{-1}$ denotes the first (n−1) components of the nth row of the inverted covariance matrix $\underline{\underline{C}}^{-1}$, and $\underline{C}_{n,n}^{-1}$ denotes the element of the inverted covariance matrix $\underline{\underline{C}}^{-1}$ indexed by (n,n), where k=1, ..., q; and
calculating q elements $y_{k,n}$ which form a respective nth component of the vector $\underline{y}_k$ of length n from 1/f-distributed random numbers, according to:

$$y_{k,n} = x_{k,n} * \sigma + \mu_k$$

where k=1, ..., q;
outputting at least one of the q sequences of random numbers of 1/f noise.

11. A method for simulating a technical system subject to 1/f noise, which comprises the steps of:
determining random numbers according to claim 10; and
using the random numbers for modeling variables present on input channels of the technical system.

12. A computer system, comprising:
processor programmed for executing the method for determining the sequences of random numbers of the 1/f noise according to claim 11.

13. A computer running a computer program, comprising:
computer-executable instructions for carrying out the method according to claim 10 for determining the sequences of random numbers of the 1/f noise.

14. A computer running the instructions stored on a computer-readable data medium having the computer-executable instructions according to claim 13.

15. A downloading method, which comprises the step of:
downloading the computer program according to claim 13 from an electronic data network onto a computer connected to the electronic data network.

16. The method according to claim 15, which further comprises using the Internet as the electronic data network.

17. A computer system, comprising:

processor programmed for executing the method for determining the sequences of random numbers of the 1/f noise according to claim 10.

18. A method for simulating a technical system subject to 1/f noise, which comprises the steps of:

determining random numbers according to claim 10; and using the random numbers for fixing variables present on input channels of the technical system; and simulating the technical system and outputting the result of the simulation.

* * * * *